US011994458B2

(12) United States Patent
Ilkov

(10) Patent No.: US 11,994,458 B2
(45) Date of Patent: May 28, 2024

(54) INTEGRATED LIGHT INTERROGATION MODULES AND METHODS OF USE THEREOF

(71) Applicant: Becton, Dickinson and Company, Franklin Lakes, NJ (US)

(72) Inventor: Fedor Ilkov, Morgan Hill, CA (US)

(73) Assignee: BECTON, DICKINSON AND COMPANY, Franklin Lakes, NJ (US)

(*) Notice: Subject to any disclaimer, the term of this patent is extended or adjusted under 35 U.S.C. 154(b) by 364 days.

(21) Appl. No.: 17/545,675

(22) Filed: Dec. 8, 2021

(65) Prior Publication Data

US 2022/0244166 A1 Aug. 4, 2022

Related U.S. Application Data

(60) Provisional application No. 63/145,627, filed on Feb. 4, 2021.

(51) Int. Cl.
*G01N 15/14* (2006.01)
*G01N 15/1434* (2024.01)
*G01N 15/10* (2006.01)

(52) U.S. Cl.
CPC . *G01N 15/1436* (2013.01); *G01N 2015/1006* (2013.01); *G01N 2015/1452* (2013.01)

(58) Field of Classification Search
CPC ....... G01N 15/1436; G01N 2015/1006; G01N 2015/1452; G01N 15/149; G01N 15/1459
See application file for complete search history.

(56) References Cited

U.S. PATENT DOCUMENTS

| 7,201,875 | B2 | 4/2007 | Norton et al. |
| 9,816,911 | B2* | 11/2017 | Chen .................... G01N 21/645 |
| 11,054,364 | B2* | 7/2021 | Foster .................. G01N 21/255 |
| 2004/0011975 | A1* | 1/2004 | Nicoli ................ G01N 15/0227 250/574 |
| 2005/0046834 | A1 | 3/2005 | Gilby |
| 2010/0220315 | A1* | 9/2010 | Morrell .............. G01N 15/1436 356/73 |
| 2014/0051157 | A1 | 2/2014 | Ilkov |
| 2018/0275045 | A1 | 9/2018 | Bassi et al. |
| 2020/0026090 | A1 | 1/2020 | Hargis et al. |
| 2020/0158615 | A1* | 5/2020 | Shi ..................... G01N 15/1436 |
| 2021/0263306 | A1* | 8/2021 | Behr ....................... G02B 3/04 |

* cited by examiner

*Primary Examiner* — Roy M Punnoose
(74) *Attorney, Agent, or Firm* — Bret E. Field; BOZICEVIC, FIELD & FRANCIS LLP

(57) ABSTRACT

Integrated light interrogation modules are provided. In embodiments, the subject integrated light interrogation modules include a flow cell having a light-accessible flow channel for transporting particles in a flow stream, a focusing optical assembly integrated with the flow cell, and a connector for operably attaching a fiber optic light conveyor to the focusing optical assembly, where the focusing optical assembly is projects excitation wavelength light from the fiber optic light conveyor onto a focal spot of the flow cell when the fiber optic light conveyor is operably attached to the connector. In certain embodiments, focusing optical assemblies also include a connector for operably attaching a fiber optic light collection element for collecting fluorescent light emitted by the particles transported through the flow cell. Flow cytometers, methods and kits for practicing the invention are also provided.

20 Claims, 12 Drawing Sheets

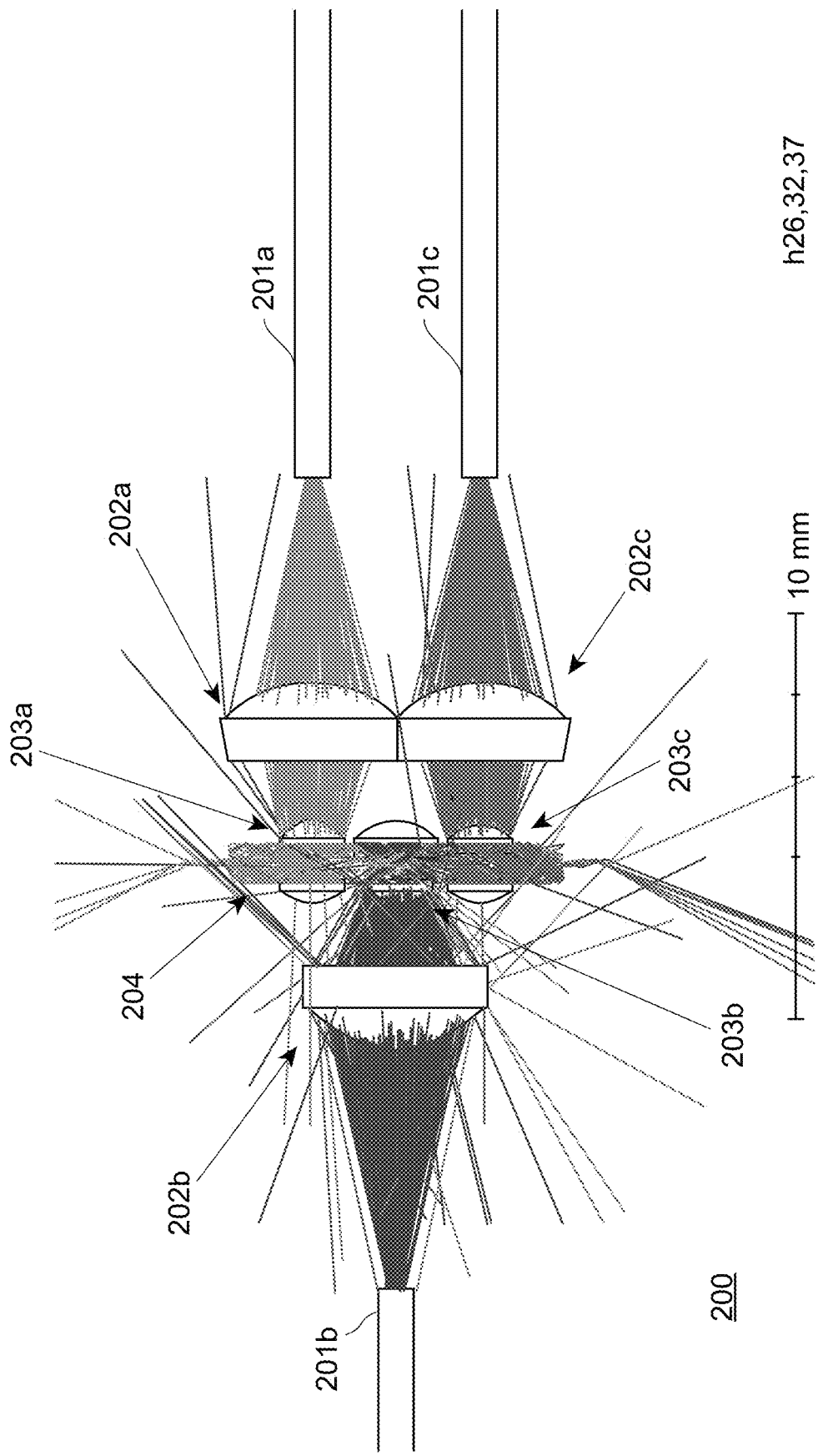

INTEGRATED LIGHT INTERROGATION MODULES AND METHODS OF USE THEREOF

CROSS-REFERENCE

Pursuant to 35 U.S.C. § 119 (e), this application claims priority to the filing date of U.S. Provisional Patent Application Ser. No. 63/145,627 filed Feb. 4, 2021; the disclosure of which application is incorporated herein by reference in their entirety.

INTRODUCTION

Flow cytometry is a technique used to characterize and, in some instances, sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light from a light source. Variations in the materials in the flow stream, such as morphologies or the presence of fluorescent labels, may cause variations in the observed light and these variations allow for characterization and separation.

In conventional flow cytometers, flow cells must be properly aligned with the light source and light collection elements such that light irradiates the flow cell in an intended manner. Assembly of flow cytometers is often a tedious process that requires a highly skilled technician to ensure proper alignment of light sources and light collection elements with the flow cell. Oftentimes, this alignment is accomplished by mounting the light source and/or the flow cell on an x-y-z stage for the three-dimensional positioning of the flow cytometer components. In addition, the positioning of mirrors and other optical components must be finely tuned to properly direct light emitted from the light source to the flow cell. Such separate components require complex mechanical mounting and may therefore suffer from lack of robustness and/or high costs.

SUMMARY

The inventors have realized that a solution to the above shortcomings is desirable. The inventors have realized that of particular interest would be the development of integrated light interrogation module that addresses one or more of the above shortcomings in the current state of the art.

Aspects of the invention include integrated light interrogation modules. In embodiments, the subject integrated light interrogation modules include a flow cell having a light-accessible channel for transporting particles in a flow stream. In certain instances, the flow cell includes a cuvette for transporting particles therethrough. Integrated light interrogation modules of interest additionally include a focusing optical assembly integrated with the flow cell. In some cases, the subject focusing optical assembly includes one or more lenses and is configured to project excitation wavelength light onto a focal spot of the flow cell and, in some instances, collect resulting fluorescent light. The lenses may, in some cases, be configured to collect light from both sides of the flow cell. In certain instances, the focusing optical assembly is attached to an outer surface of the flow cell, while in other instances the focusing optical assembly is embedded in the flow cell. In additional embodiments, integrated light interrogation modules include a connector for operably attaching a fiber optic light conveyor to the focusing optical assembly. The subject integrated light interrogation modules may additionally include a connector for operably attaching a fiber optic light collection element to the focusing optical assembly, where the fiber optic light collection element is configured to collect fluorescent light emitted by the particles transported through the focal spot of the flow cell following irradiation of the particles with excitation wavelength light. Where integrated light interrogation modules include fiber optic light conveyor connectors and fiber optic light collection element connectors, the connectors may, in some instances, be arranged orthogonally to each other with reference to the flow cell. In some embodiments, the integrated light interrogation module includes a plurality of focusing optical assemblies having a plurality of connectors for operably attaching a fiber optic light conveyor, and in some cases a fiber optic light collection element, to each focusing optical assembly.

Aspects of the invention also include flow cytometers having integrated light interrogation modules. Flow cytometers of interest include a light source, a fiber optic light conveyor optically coupled to the light source and an integrated light interrogation module having a focusing optical assembly and a connector for operably attaching the fiber optic light conveyor to the focusing optical assembly, where the focusing optical assembly is configured to project excitation wavelength light from the fiber optic light conveyor onto a focal spot of the flow cell when the fiber optic light conveyor is operably attached to the connector. As discussed above, integrated light interrogation modules for use in the instant flow cytometers may also include a connector for operably attaching a fiber optic light collection element to the focusing optical assembly. Accordingly, flow cytometers of interest may also include a fiber optic light collection element operably attached to the focusing optical assembly of the integrated light interrogation module. In such embodiments, the focusing optical assembly may be configured to direct fluorescent light from the flow cell to the fiber optic light collection element. In some embodiments, the light source may include a plurality of lasers, and each laser may be connected to a fiber optic light conveyor for conveying excitation wavelength light to the integrated light interrogation module. In such embodiments, the light source may be an excitation module having a plurality of co-located lasers. Flow cytometers of interest may also include one or more detectors optically coupled to one or more fiber optic light collection elements for detecting fluorescent light. In certain instances, the one or more fiber optic light collection elements are optically coupled to a detection module having a plurality of co-located detectors.

Aspects of the invention may additionally include methods for analyzing a sample in a flow cytometer having an integrated light interrogation module, e.g., as described above. Methods of interest include introducing a biological sample into a flow cytometer having a light source, one or more fiber optic light conveyors optically coupled to the light source, one or more fiber optic light collection elements and an integrated light interrogation module having, for example, one or more focusing optical assemblies and connectors for attaching fiber optic light conveyors and fiber optic light collection elements.

Methods for assembling a flow cytometer are also provided. In embodiments, such methods include positioning an integrated light interrogation module into a flow cytometer.

In such embodiments, methods include operationally attaching one or more fiber optic light conveyors and/or fiber optic light collection elements to the focusing optical assembly of the integrated light interrogation module.

BRIEF DESCRIPTION OF THE FIGURES

The invention may be best understood from the following detailed description when read in conjunction with the accompanying drawings. Included in the drawings are the following figures:

FIG. 2 depicts an integrated light interrogation module having three focusing optical assemblies according to certain embodiments.

DETAILED DESCRIPTION

Figure 1A:
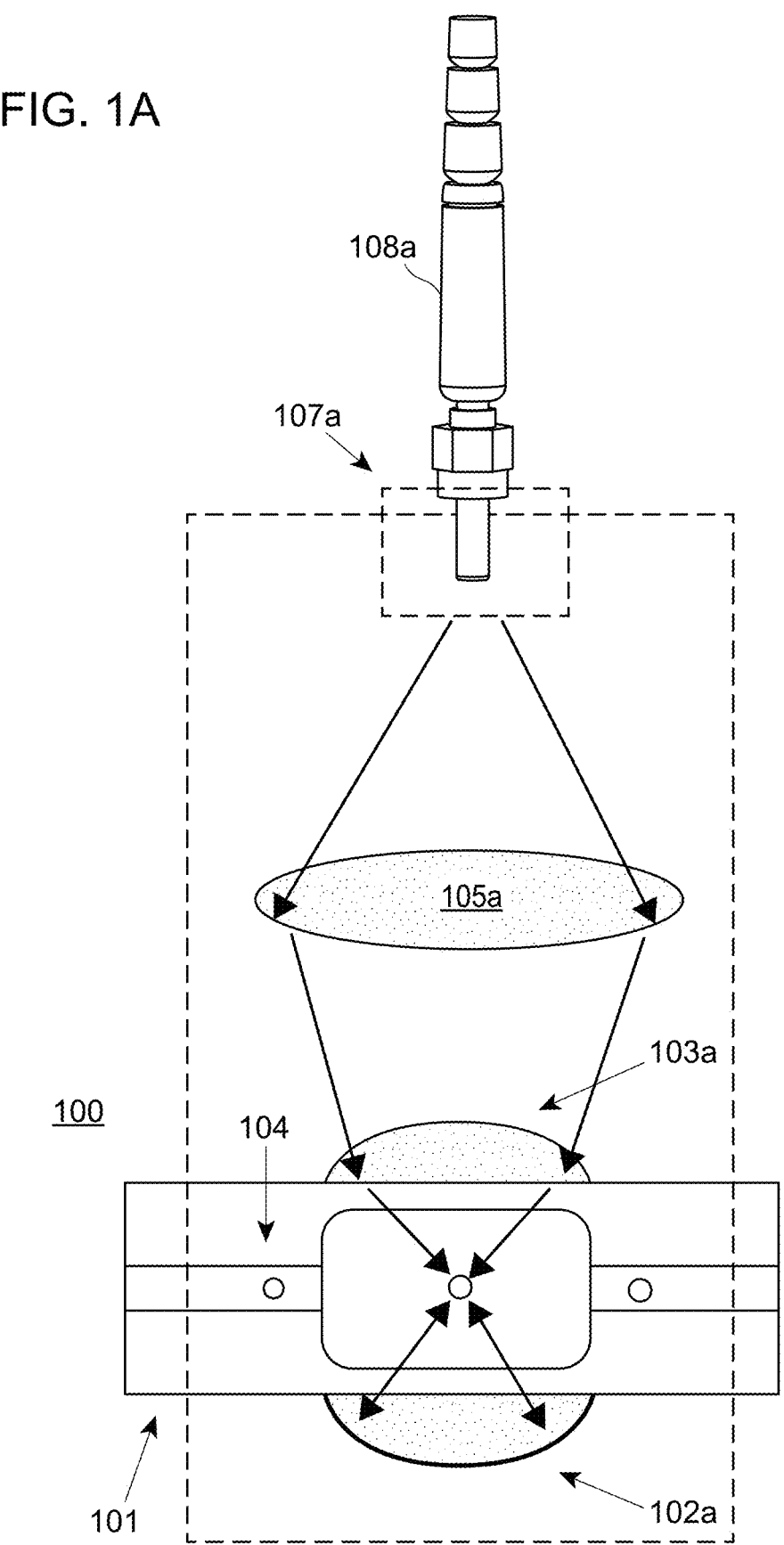
FIGS. 1A-B depict an integrated light interrogation module according to certain embodiments.

Integrated light interrogation modules are provided. In embodiments, the subject integrated light interrogation modules include a flow cell having a light-accessible flow channel for transporting particles in a flow stream, a focusing optical assembly integrated with the flow cell, and a connector for operably attaching a fiber optic light conveyor to the focusing optical assembly, where the focusing optical assembly is configured to project excitation wavelength light from the fiber optic light conveyor onto a focal spot of the flow cell when the fiber optic light conveyor is operably attached to the connector. In certain embodiments, focusing optical assemblies also include a connector for operably attaching a fiber optic light collection element configured to collect fluorescent light emitted by the particles transported through the flow cell. Flow cytometers, methods and kits for practicing the invention are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Integrated Light Interrogation Modules

As discussed above, integrated light interrogation modules are provided. Aspects of the subject integrated light interrogation modules include a flow cell and a focusing optical assembly configured to project excitation wavelength light onto a focal spot of the flow cell. In certain cases, the subject integrated light interrogation modules reduce the need for manual adjustment of the focusing optical assembly to achieve optical alignment, e.g., because each component exists in a fixed position relative to one another and thereby remains in proper optical alignment. In some instances, the integrated optics of the integrated light interrogation module described herein may enhance efficiency with respect to the collection of fluorescent light emitted by particles in the flow cell, e.g., by increasing the amount of fluorescent light collected relative to noise.

As discussed herein, a "flow cell" is described in its conventional sense to refer to a component, such as a cuvette, containing a flow channel for a liquid flow stream for transporting particles in a sheath fluid. Cuvettes of interest include containers having a passage running therethrough. The flow stream for which the flow channel is configured may include a liquid sample injected from a sample tube. In certain instances, the flow cell includes a light-accessible flow channel. In such instances, the flow cell includes transparent material (e.g., quartz) that permits the passage of light therethrough. In some cases, the flow cell is configured for irradiation with light from a light source at an interrogation point. The "interrogation point" discussed herein refers to a region within the flow cell in which the particle is irradiated by light from the light source, e.g., for analysis. The size of the interrogation point may vary as desired. For example, where 0 μm represents the optical axis of light emitted by the light source, the interrogation point may range from −50 μm to 50 μm, such as −25 μm to 40 μm, and including −15 μm to 30 μm.

As discussed above, integrated light interrogation modules of interest include a focusing optical assembly integrated with the flow cell. By "integrated" it is meant that that the flow cell and focusing optical assembly, rather than existing as separate and distinct elements, are incorporated with one another such that they form a cohesive whole. The integrated flow cell and focusing optical assembly may, for example, be attached to one another at a fixed location. In other words, the focusing optical assembly may be a component part of the structure of the flow cell. In some cases, the subject integrated elements cannot be easily separated into component parts without damage to one or more of the parts. Accordingly, in certain instances, integrated optical components exist in a fixed position relative to one another, e.g., so that they maintain proper optical alignment over time. In some cases, therefore, focusing optical assemblies of the subject integrated light interrogation modules are non-adjustable, e.g., because the components already exist in a state of optimal alignment.

The focusing optical assembly described herein may be configured to project excitation wavelength light from the light source onto a focal spot of the flow cell. By "focal spot", it is meant a particular region of the interrogation zone of the flow cell that that is irradiated by one or more of lasers associated with the light source. Focusing optical assemblies of interest, therefore, receive excitation wavelength light from one or more lasers and focus that light onto a particular focal spot within the interrogation zone of the flow cell. Put another way, the subject focusing optical assembly is configured to focus excitation wavelength light onto one particular portion of the flow cell while preventing that light from irradiating the flow cell at another, undesirable, location.

Any convenient optical element may be employed in the subject focusing optical assembly. For example, the focusing optical assembly may include one or more prisms for refracting light from a light source and directing the light to a focal spot in the interrogation zone of the flow cell. In certain embodiments, the focusing optical assembly may include one or more lenses. In such embodiments, the focusing optical assembly may include any convenient number of lenses, such as 1 to 10 lenses, 2 to 5 lenses, and including 2 to 4 lenses. In some embodiments, the focusing optical assembly includes 2 lenses. In other embodiments, the focusing optical assembly includes 4 lenses.

In certain embodiments, one or more lenses in the focusing optical assembly are micro-lenses. In such embodiments, the subject micro-lenses may be of any convenient size and shape. In some instances, focusing optical assembly includes micro-lenses having a diameter ranging from 10 μm to 5 mm, such as 50 μm to 2 mm and including 100 μm to 1 mm. In some cases, the subject micro-lenses are spherically shaped. In embodiments, the micro-lenses possess a plane surface on one side and a spherical (e.g., convex) surface on the other. In additional embodiments, the micro-lenses are aspheric lenses, i.e., lenses possessing dimensions that are not spherical or cylindrical. In embodiments of the focusing optical assembly including multiple micro-lenses, each micro-lens in the focusing optical assembly may be the same or different. For example, the micro-lenses may possess different sizes and/or shapes as desired for focusing excitation wavelength light onto a focal spot of the flow cell.

Lenses of interest in the focusing optical assembly may be formed from any suitable material, including but not limited to, glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7) or combinations thereof. In some embodiments, lenses of the focusing optical assembly possess a transparency window of from 150 nm to 5 μm; from 180 nm to 8 μm, from 185 nm to 2.1 μm, from 200 nm to 6 μm, from 200 nm to 11 μm, from 250 nm to 1.6 μm, from 350 nm to 2 μm, from 600 nm to 16 μm, from 1.2 μm to 8 μm, from 2 μm to 16 μm or some other wavelength range. The refractive index of lenses of interest may vary, ranging from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3.

In some embodiments, components (e.g., lenses) of the focusing optical assembly may modify the beam profile of a light beam across one or more of the horizontal axis and the vertical axis. As described herein, the horizontal and vertical axis refer to the axes that are orthogonal to the optical axis (i.e., beam path) of the beam of light and in embodiments, form the X-Y plane of the beam profile. The horizontal axis of output beams of light is orthogonal to the longitudinal axis of the flow stream (e.g., a flow stream in a flow cytometer) and the vertical axis of output beams of light is parallel to the longitudinal axis of the flow stream. In some embodiments, the focusing optical assembly of interest modifies the beam profile of a propagated light beam across the horizontal axis. In other embodiments, lenses of interest modify the beam profile of a propagated light beam across the vertical axis. In yet other embodiments, lenses of interest modify the beam profile of a propagated light beam across the horizontal axis and the vertical axis. The focusing optical assembly in these embodiments may include diffractive optics or refractive optics. In some embodiments, the focusing optical assembly includes a biconic lens. In other embodiments, the focusing optical assembly includes an achromatic lenses.

The focusing optical assembly may be integrated with the flow cell through a variety of different configurations, as desired. For example, the focusing optical assembly may be stably associated with an outer surface of the flow cell. In some embodiments, the focusing optical assembly may be attached via an adhesive. Any convenient optical adhesive may be employed during the integration of the focusing optical assembly with the flow cell. For example, adhesives of interest may include epoxies, light curable acrylics, elastomers (e.g., silicone, silicone-free silane), cyanoacrylates, and structural adhesives (e.g., those having a resin and activator). In some embodiments, the adhesive is curable by exposure to light (e.g., UV light). In certain embodiments, the optical adhesive is clear. In some cases, a lens of the focusing optical assembly is integrated with the flow cell via the application of an optical adhesive to the periphery of the lens, i.e., around the edge of the lens. The refractive index of adhesives of interest may vary, ranging from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3.

In other embodiments, the focusing optical assembly is attached to an outer surface of the flow cell via the association of the lenses of the focusing optical assembly with a housing that partially or substantially completely surrounds the flow cell. The flow cell housing may be fabricated from any convenient material. In some embodiments, the flow cell housing is made of a transparent material (e.g., glass, plastic). In other embodiments, the housing surrounding the flow cell is opaque. In embodiments where the housing is opaque, the housing may be configured such that only light focused by the focusing optical assembly irradiates the flow cell. In other words, only light from the light source that is focused onto a focal spot of the flow cell by a lens of the focusing optical assembly is able to penetrate the flow cell housing due to the opacity of said housing. An opaque housing may, in some instances, prevent unintended or undesirable rays of light from irradiating the flow cell, being detected, and generating optical noise in flow cytometer data. In some embodiments, components of the focusing optical assembly (e.g., one or more lenses) may be incorporated into the structure of the housing. In certain cases, lenses of the optical assembly may be incorporated into the structure of the housing via a press fit (i.e., interference fit). Press fit is a known technique whereby a hole that is slightly smaller than the shape of the focusing optical assembly component (e.g., lens) is generated in the housing. The focusing optical assembly component and housing may subsequently held together by friction after the two elements are forced together.

In additional embodiments, the focusing optical assembly is attached to an outer surface of the flow cell via optical contact bonding. As is known in the art, optical contact bonding involves joining two surfaces by exploiting intermolecular forces present between the surfaces. Intermolecular forces relevant in optical contact bonding include Van der Waals forces, hydrogen bonds and dipole-dipole interactions. In embodiments of the invention involving optical contact bonding, surfaces of the focusing optical assembly and the flow cell may be practically conformal (i.e., flat and smooth) so that intermolecular forces may draw the elements together.

In other cases, components of the focusing optical assembly are embedded in the wall of the flow cell. In such cases, the focusing optical assembly may be incorporated into the structure of the flow cell rather than attached to the surface thereof. Components (e.g., lenses) of the focusing optical assembly may be embedded in the wall of the flow cell by any convenient mechanism. For example, in some embodiments, lenses of the focusing optical assembly may be embedded in the wall of the flow cell via a press fit (e.g., as described above). In such embodiments, a hole that is slightly smaller than the shape of the focusing optical assembly component (e.g., lens) is generated in the side of the flow cell. The focusing optical assembly component and flow cell may subsequently held together by friction after the two elements are forced together.

Integrated light interrogation modules of interest are also configured for the operable attachment of a fiber optic light conveyor to the focusing optical assembly. As described herein, a "fiber optic light conveyor" refers to an elongated structure having a proximal and distal end, where the elongated structure is fabricated from a light transparent material that is configured for transmitting light from a light source at the proximal end to the focusing optical assembly at the distal end. In some embodiments, the transparent material includes a glass material such as, but not limited to, silica (e.g., fused silica). In other embodiments, the transparent material includes a polymeric material. In such embodiments, the transparent material may include one or more materials such as, but not limited to, poly(methylmethacrylate) (PMMA), polystyrene, and poly(perfluorobutenyl vinyl ether) (CYTOP). In some embodiments, the fiber optic light collector is a single-mode fiber. As is understood in the art, a single-mode fiber is an optical fiber that conveys light having one mode at a given time. In other instances, the fiber optic light collector is a multi-mode fiber. In contrast to a single-mode fiber, a multi-mode fiber propagates light having multiple modes at the same time. The diameter of the fiber optic light conveyor may vary as desired. In some embodiments, the diameter of the subject fiber optic light conveyor ranges from 0.1 mm to 3 mm, such as 0.2 mm to 2.5 mm, 0.3 mm to 2.2 mm, 0.4 mm to 2 mm. 0.5 mm to 1.5 mm, and including 0.6 mm to 1.2 mm.

Where the integrated light interrogation module is configured for the operable attachment of a fiber optic light conveyor, embodiments of the invention include a fiber optic light conveyor connector for attaching the fiber optic light conveyor to the focusing optical assembly. In such cases, the fiber optic light conveyor connector may be configured to attach a fiber optic light conveyor to the focusing optical assembly such that the focusing optical assembly projects excitation wavelength light from the fiber optic light conveyor onto a focal spot of the flow cell when the fiber optic light conveyor is operably attached to the connector. The fiber optic light conveyor connector may operably attach the fiber optic light conveyor to the focusing optical assembly via any convenient mechanism. In some embodiments, the connector may operably attach a fiber optic light conveyor to the focusing optical assembly such that the fiber optic light conveyor requires little, if any, optical adjustment to ensure proper alignment with the flow cell. In such embodiments, the connector may be located adjacent to the focusing optical assembly such that when a fiber optic light conveyor is operably attached thereto, the fiber optic light conveyor is optically aligned with the focusing optical assembly and focal spot such that excitation wavelength light is projected onto the focal spot in an optimal manner. In some embodiments, the fiber optic light conveyor connector may physically couple the fiber optic light conveyor to the focusing optical assembly, such as with an adhesive. Adhesives of interest may include epoxies, light curable acrylics, elastomers (e.g., silicone, silicone-free silane), cyanoacrylates, and structural adhesives (e.g., those having a resin and activator). In some embodiments, the adhesive is curable by exposure to light (e.g., UV light). In other embodiments, the fiber optic light conveyor connector is configured to releasably attach the fiber optic light conveyor to the focusing optical assembly. In such embodiments, the fiber optic light conveyor connector may include one or more clamps, magnets, latches, notches, countersinks, counter-bores, grooves, pins, tethers, hinges, or combinations thereof. In some cases where the integrated light interrogation module includes a housing, the fiber optic light conveyor connector may be attached to the housing so that the fiber optic light conveyor may transmit excitation wavelength light therethrough.

In embodiments, the light conveyed to the focusing optical assembly by the fiber optic light conveyor retains the power intensity of the light emitted by the light source, such that power from the beam of light from the light source is reduced by 10% or less, such as 9% or less, such as by 8% or less, such as by 7% or less, such as by 6% or less, such as by 5% or less, such as by 4% or less, such as by 3% or less, such as by 2% or less, such as by 1% or less, such as 0.5% or less, such as by 0.1% or less, such as by 0.01% of less, such as by 0.001% or less and including by 0.0001% or less.

In further embodiments, integrated light interrogation modules of interest include one or more auxiliary lenses positioned between the fiber optic light conveyor connector and the focusing optical assembly. In such embodiments, the auxiliary lens may be configured to focus light from a connected fiber optic light conveyor onto the focusing optical assembly. In other words, the subject auxiliary lenses collect excitation wavelength light emitted from the distal end of the fiber optic light conveyor and direct the excitation wavelength light onto the surface of the focusing optical assembly. In certain cases, auxiliary lenses positioned between the fiber optic light conveyor and the focusing optical assembly increase the amount of excitation wavelength light projected onto the focal spot.

In additional embodiments, the integrated light interrogation module may be configured for the operable attachment of a fiber optic light collection element to the focusing optical assembly. As described herein, the phrase "fiber optic light collection element" refers to an elongated structure having a proximal and distal end, where the elongated structure is fabricated from a light transparent material that is configured for transmitting light from a flow cell at the proximal to one or more detection elements at the distal end. In certain embodiments, the fiber optic light collection element is configured to collect fluorescent light emitted by the particles transported through the focal spot after those particles have been irradiated with excitation wavelength light. In some embodiments, the transparent material includes a glass material such as, but not limited to, silica (e.g., fused silica). In other embodiments, the transparent material includes a polymeric material. In such embodiments, the transparent material may include one or more materials such as, but not limited to, poly(methyl-methacrylate) (PMMA), polystyrene, and poly(perfluoro-butenyl vinyl ether) (CYTOP). In some embodiments, the fiber optic light collector is a single-mode fiber. In some embodiments, the fiber optic light collection element is a single mode fiber. In other instances, the fiber optic light collection element is a multi-mode fiber. The diameter of the fiber optic light collection element may vary as desired. In some embodiments, the diameter of the subject fiber optic light conveyor ranges from 0.1 mm to 3 mm, such as 0.2 mm to 2.5 mm, 0.3 mm to 2.2 mm, 0.4 mm to 2 mm. 0.5 mm to 1.5 mm, and including 0.6 mm to 1.2 mm.

Where the integrated light interrogation module is configured for the operable attachment of a fiber optic light collection element, embodiments of the invention include a fiber optic light collection element connector for attaching the fiber optic light collection element to the focusing optical assembly. In certain cases, the subject fiber optic light collection element connector is configured to attach a fiber optic light collection element to the focusing optical assembly such that the focusing optical assembly collects fluorescent light emitted by the particles and directs said light to the fiber optic light collection element when such is operably attached to the fiber optic light collection element connector. The fiber optic light collection element connector may operably attach the fiber optic light collection element to the focusing optical assembly via any convenient mechanism. In some embodiments, the fiber optic light collection element connector may operably attach a fiber optic light collection element to the focusing optical assembly such that the fiber optic light collection element requires little, if any, optical adjustment to ensure proper optical alignment with the flow cell. In such embodiments, the fiber optic light collection element connector may be located adjacent to the focusing optical assembly such that when a fiber optic light collection element is operably attached thereto, the fiber optic light collection element is optically aligned with the focusing optical assembly and focal spot such that fluorescent light is directed from the focal spot and collected by the fiber optic light collection element. In some embodiments, the fiber optic light collection element connector may physically couple the fiber optic light collection element to the focusing optical assembly, such as with an adhesive. Adhesives of interest may include epoxies, light curable acrylics, elastomers (e.g., silicone, silicone-free silane), cyanoacrylates, and structural adhesives (e.g., those having a resin and activator). In some embodiments, the adhesive is curable by exposure to light (e.g., UV light). In other embodiments, the fiber optic light collection element connector is configured to releasably attach the fiber optic light collection element to the focusing optical assembly. In such embodiments, the fiber optic light collection element connector may include one or more clamps, magnets, latches, notches, countersinks, counter-bores, grooves, pins, tethers, hinges, or combinations thereof. In some cases where the integrated light interrogation module includes a housing, the fiber optic light collection element connector may be attached to the housing so that the fiber optic light collection element may collect fluorescent light therethrough.

In further embodiments, integrated light interrogation modules of interest include one or more auxiliary lenses positioned between the fiber optic light collection element connector and the focusing optical assembly. In such embodiments, the auxiliary lens may be configured to focus fluorescent light from the focal spot of the flow cell onto the fiber optic light collection element. In other words, the subject auxiliary lenses collect fluorescent wavelength light emitted from the flow cell and direct that light onto the proximal end of the fiber optic light collection element. In certain cases, auxiliary lenses positioned between the fiber optic light collection element and the focusing optical assembly increase the amount of fluorescent wavelength light collected by the fiber optic light collection element.

In embodiments of the integrated light interrogation module including both a fiber optic light conveyor connector and a fiber optic light collection element connector, the fiber optic light conveyor connector and fiber optic light collection element may assume any convenient position relative to one another with respect to the flow cell. In some embodiments, the fiber optic light collection element is attached to the focusing optical assembly on the opposite side of the integrated light interrogation module with respect to the fiber optic light conveyor connector. In some embodiments, the fiber optic light conveyor connector and fiber optic light collection element connector may exist at an angle relative to one another, such as at an angle ranging from 10° to 180°, such as from 15° to 170°, such as from 20° to 160°, such as from 25° to 160° and including from 30° to 60°, for example at a 90° angle. In certain embodiments, the fiber optic light collection element connector is attached to the focusing optical assembly orthogonally with respect to the fiber optic light conveyor connector. In some cases, the focusing optical assembly may be configured to direct fluorescent light from the focal spot of the flow cell to the fiber optic light collection element when such is operably attached (e.g., as described above). In these cases, components of the focusing optical assembly (e.g., lenses) may be integrated with the flow cell such that light is projected on the focal spot and collected therefrom in accordance with the positioning of the fiber optic light conveyor connector and fiber optic light collection element connector.

For example, in some embodiments, focusing optical assemblies include a lens integrated with the flow cell in the direction of excitation as defined by the fiber optic light conveyor connector. In additional embodiments, the focusing optical assembly includes a second lens integrated with the flow cell in the direction of excitation as defined by the fiber optic light conveyor connector. The phrase "in the direction of excitation" refers to the optical axis along which excitation wavelength light is propagated by the fiber optic light conveyor to the focal spot of the flow cell. In embodiments including first and second lenses integrated with the flow cell in the direction of excitation, each lens may be positioned on the same side of the flow cell or on different sides of the flow cell. For example, in some cases where the fiber optic light conveyor connector is arranged orthogonally with respect to the fiber optic light collector connector, the first lens is positioned adjacent to the fiber optic light conveyor connector, while the second lens is positioned on the opposite side of the flow cell relative to first lens. Where the focusing optical assembly includes such a second lens integrated on the opposite side of the flow cell relative to the fiber optic light conveyor connector, embodiments of the second lens may include a reflective material configured to reflect excitation wavelength light back to the focal spot. In such instances, the reflective material may be an optical coating deposited on the lens that is configured to increase the reflectivity of that lens. Any convenient reflective material may be employed. For example, the reflective coating may include zinc sulfide, titanium dioxide, magnesium fluoride, silicon dioxide, and combinations thereof. In some embodiments, the reflectivity of the second lens increases the amount of fluorescent light that is collected by the fiber optic light collection element, thereby increasing the amount of fluorescent signal collected relative to noise.

In embodiments of the invention including a fiber optic light collection element connector, focusing optical assemblies may include a lens integrated with the flow cell in the direction of fluorescent light collection as defined by the fiber optic light collection element connector. In further embodiments, the focusing optical assembly includes a second lens integrated with the flow cell in the direction of fluorescent light collection as defined by the fiber optic light collection element connector. The phrase "in the direction of fluorescent light collection" refers to the optical axis along which the fiber optic light collection element collects fluorescent light from the focal spot. In embodiments of the invention including first and second lenses integrated with the flow cell in the direction of fluorescent light collection, each lens may be positioned on the same side of the flow cell or on different sides of the flow cell. For example, in some cases, the first lens is positioned adjacent to the fiber optic light collection element connector, while the second lens is positioned on the opposite side of the flow cell relative to the first lens. For example, in some cases where the fiber optic light conveyor connector is arranged orthogonally with respect to the fiber optic light collector connector, the first lens is positioned adjacent to the fiber optic light collection element connector, while the second lens is positioned on the opposite side of the flow cell relative to first lens. Where the focusing optical assembly includes such a second lens integrated on the opposite side of the flow cell relative to the fiber optic light collection element connector, the second lens may include a reflective material configured to reflect excitation wavelength light back to the focal spot. In such instances, the reflective material may be an optical coating deposited on the lens that is configured to increase the reflectivity of that lens. Any convenient reflective material may be employed. For example, the reflective coating may include zinc sulfide, titanium dioxide, magnesium fluoride, silicon dioxide, and combinations thereof. In some embodiments, the reflectivity of the second lens increases the amount of fluorescent light that is collected by the fiber optic light collection element, thereby increasing the amount of fluorescent signal collected relative to noise.

Figure 1B:
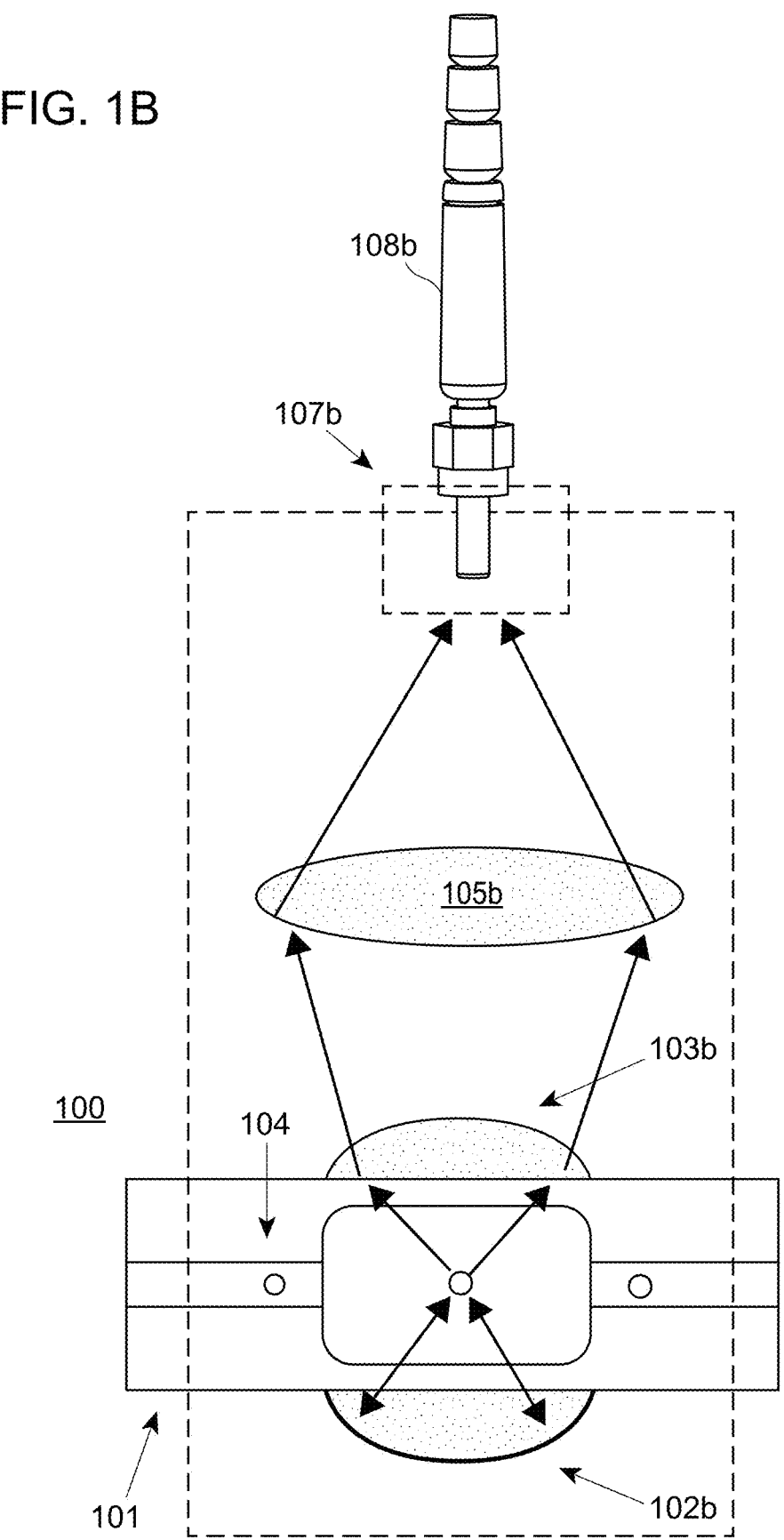

For example, FIG. 1A-B depict one embodiment of an integrated light interrogation module 100. FIG. 1A presents a view of the integrated light interrogation module 100 illustrating the irradiation of particles via excitation wavelength light, while FIG. 1B presents a rotated view of the same integrated light interrogation module 100 illustrating the collection of resulting fluorescent light.

As shown in FIG. 1A, Particles 104 pass through flow cell 101 and are irradiated by light conveyed by fiber optic light conveyor 108a. Fiber optic light conveyor 108a is connected to the integrated light interrogation module 100 via connector 107a and emits excitation wavelength light which is then focused by auxiliary lens 105a. Auxiliary lens focused excitation wavelength light is subsequently focused onto the focal spot of the flow cell 101 by lens 103a of the focusing optical assembly. Lens 102a of the focusing optical assembly is located on the opposite side of the flow cell 101 relative to lens 103a and is coated with a reflective material for reflecting light back through the focal spot of the flow cell 101. After the particle is irradiated, particle-modulated light is collected by a fiber optic light collection element, which, in the example of FIG. 1A, is positioned orthogonally with respect to fiber optic light conveyor 108a and is therefore located behind flow cell 101.

FIG. 1B depicts a rotated view of the integrated light interrogation module 100 and illustrates the fluorescent light collection optics. Particles 104 pass through flow cell 101 and are irradiated by light conveyed by fiber optic light conveyor 108a. In the example of FIG. 1B, the fiber optic light conveyor 108a is located behind flow cell 101 and projects excitation wavelength light onto flow cell 101 in a direction that is normal to the plane of the page. The integrated light interrogation module 100 includes a focusing optical assembly having lens 103b for directing the fluorescent light onto fiber optic light collection element 108b operably attached to the integrated light interrogation module 100 via connector 107b. Lens 102b is coated with a reflective material for reflecting light back through the focal spot of the flow cell. The integrated light interrogation module 100 also includes an auxiliary lens 105b positioned between the fiber optic light collection element connector 107b and the lens 103b of the focusing optical assembly.

As discussed above, the subject integrated light interrogation modules may include one or more focusing optical assemblies. In some embodiments, integrated light interrogation modules include a single focusing optical assembly. In such embodiments, the subject focusing optical assembly may include a single fiber optic light conveyor for projecting excitation wavelength light onto the flow cell and a single fiber optic light collection element for collecting particle-modulated light from the flow cell. However, flow cells of interest may additionally include any convenient number of focal spots for illuminating particles transported therethrough. Accordingly, the subject integrated light interrogation modules may correspondingly include a plurality of focusing optical assemblies for projecting excitation wavelength light onto each of the focal spots and collecting fluorescent light emitting therefrom (e.g., as described above). In some instances, the plurality of focusing optical assemblies includes 2 to 15 focusing optical assemblies, such as 2 to 7 focusing optical assemblies, and including 2 to 4 focusing optical assemblies. As such, in certain instances, integrated light interrogation modules of interest include 2 or more focusing optical assembles, 3 or more focusing optical assemblies 4 or more focusing optical assemblies, 5 or more focusing optical assemblies, 6 or more focusing optical assemblies, 7 or more focusing optical assemblies, 8 or more focusing optical assemblies, 9 or more focusing optical assemblies and including 10 or more focusing optical assemblies. Where the subject integrated light interrogation modules include a plurality of focusing optical assemblies, integrated light interrogation modules of interest may include a plurality of connectors for operably attaching a fiber optic light conveyor to each focusing optical assembly in the plurality of optical assemblies. In additional cases, integrated light interrogation modules also include a plurality of connectors for operably attaching a fiber optic light collection element to each focusing optical assembly in the plurality of focusing optical assemblies.

Where the subject integrated light interrogation modules include multiple focusing optical assemblies, components of each focusing optical assembly may be arranged with respect to adjacent focusing optical assemblies along the length of the flow cell in any convenient manner. For example, in some cases, each of the fiber optic light conveyor connectors associated with each of the plurality of focusing optical assemblies is arranged orthogonally with respect to one or more adjacent fiber optic light conveyor connectors. This may result in a "staggered" pattern in which fiber optic light conveyor connectors are arranged along different sides of the flow cell in an alternating fashion. In other cases, each of the fiber optic light conveyor connectors is arranged on the same side of the flow cell with respect to the adjacent fiber optic light conveyor connectors. Where the plurality of focusing optical assemblies also include fiber optic light collection element connectors, a same-side arrangement of fiber optic light conveyor connectors along the length of the flow cell may correspond to a same-side arrangement of fiber optic light collection element connectors along a different (e.g., orthogonal) side of the flow cell. In further embodiments, fiber optic light conveyor connectors may be arranged on the same side of the flow cell, while corresponding fiber optic light collection element connectors are "staggered" in directions that are orthogonal to the side having the fiber optic light conveyor connectors. In other words, a first fiber optic light collection element connector may be arranged orthogonally in a first direction with respect to the fiber optic light conveyor connectors, while a second fiber optic light collection element may be arranged orthogonally in a second direction that is opposite the first direction with respect to the fiber optic light conveyor connectors, and so on.

FIG. 2 depicts an integrated light interrogation module 200 having three orthogonally arranged focusing optical assemblies 203a, 203b and 203c integrated with flow cell 204. Integrated light interrogation module 200 also includes auxiliary lenses 202a, 202b and 202c positioned between fiber optic light collectors 201a, 201b and 201c and focusing optical assembles 203a, 203b and 203c, respectively. The fiber optic light collection element connectors 201a-c and corresponding focusing optical assemblies 203a-c exist in a staggered pattern in relationship to each other, i.e. where each fiber optic light collection element connector exists on an opposite side of flow cell with respect to an adjacent fiber optic light collection element connector. In the example of FIG. 2, fiber optic light conveyors are located behind flow cell 204 and project excitation wavelength light onto the flow cell in a direction that is normal to the plane of the page.

Figure 3:
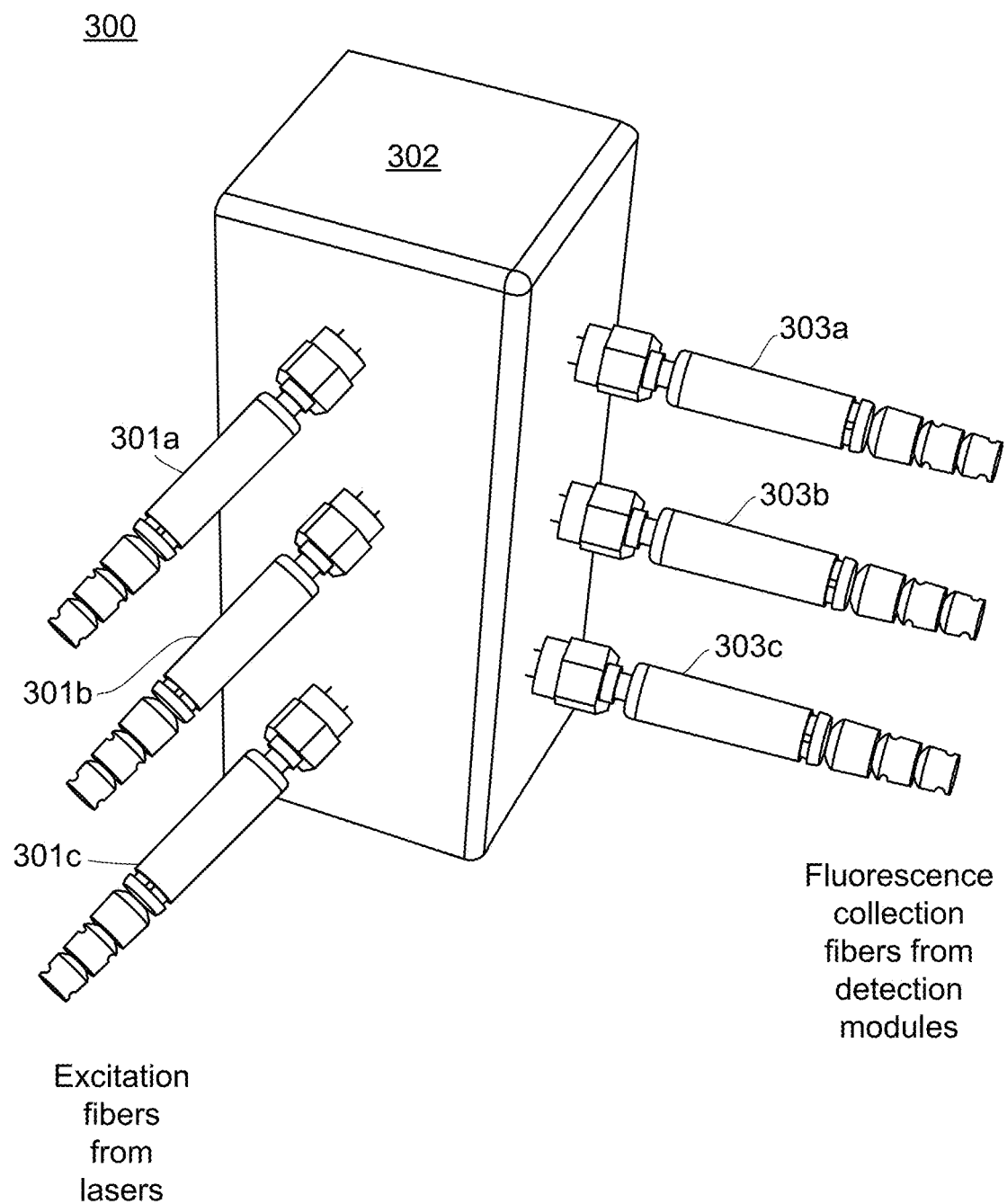
FIG. 3 depicts an integrated light interrogation module including a plurality of orthogonally arranged fiber optic light conveyors and fiber optic light collection elements according to certain embodiments.

FIG. 3 depicts integrated light interrogation module 300 having orthogonally arranged fiber optic light conveyor connectors and fiber optic light collection element connectors for operably attaching fiber optic light conveyors 301a-c and fiber optic light collection elements 303a-c to respective focusing optical assemblies (not shown) integrated with flow cell 302 surrounded by an opaque housing. As shown in FIG. 3, the fiber optic light conveyors 301a-c are arranged on the same side of flow cell 302, and orthogonally arranged fiber optic light collection elements 303a-c similarly exhibit a same-side configuration.

As discussed above, aspects of the subject integrated light interrogation module include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 10000 μm, such as from 25 μm to 7500 μm, such as from 50 μm to 5000 μm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec to 2500 µL/sec, such as 50 µL/sec to 1000 µL/sec, and including 75 µL/sec or more to 750 µL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

Flow Cytometers Including Integrated Light Interrogation Modules

Aspects of the invention additionally include flow cytometers having integrated light interrogation modules, e.g., as described above. Flow cytometers of interest include a light source, one or more fiber optic light conveyors and an integrated light interrogation module. In some cases, flow cytometers also include one or more fiber optic light collection elements, and one or more detectors.

As discussed above, aspects of the invention further include a light source. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The laser may be positioned any suitable distance from the integrated light interrogation module, such as where the light source and the integrated light interrogation module are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle to the integrated light interrogation module, such as at an angle ranging from 10° to 90°, such as from 15° to 85°, such as from 20° to 80°, such as from 25° to 75° and including from 30° to 60°, for example at a 90° angle. In some instances, a flow cytometer may have any number of lasers, beam splitters, filters, and detectors at various wavelengths and in various different configurations.

Where more than one laser is employed, the sample may be irradiated with the lasers simultaneously or sequentially, or a combination thereof. For example, the sample may be simultaneously irradiated with each of the lasers. In other embodiments, the flow stream is sequentially irradiated with each of the lasers. As such, in some embodiments of the invention including multiple lasers, the light source may be configured to irradiate the sample with multiplexed beams. Any convenient multiplexing method may be employed. For example, the lasers may be configured to produce time-multiplexed beams. "Time-multiplexing" is referred to in its conventional sense to describe transmitting independent signals over a common signal path such that each signal is only transmitted over a fraction of time in an alternating pattern. In some embodiments of the invention that include a plurality of multiplexed lasers, a single fiber optic light conveyor may be provided to convey multiplexed beams from the plurality of lasers to the flow cell. In such embodiments, the single fiber optic light conveyor may be releasably attached to a single focusing optical assembly via a single fiber optic light conveyor connector.

Where more than one laser is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, flow cytometers may irradiate the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, the subject flow cytometers irradiate the sample in the flow cell with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

In some embodiments, the light source is an excitation module. In certain embodiments, the subject excitation module includes a plurality of co-located lasers. Any convenient number of lasers may be included in the subject excitation module. In some cases, the excitation module includes 2 to 10 lasers, such as 3 to 8 lasers, and including 5 to 7 lasers. In some embodiments, the excitation module includes 6 lasers. In some embodiments, the excitation module is operably coupled to a single fiber optic light conveyor configured to convey excitation wavelength light to the integrated light interrogation module (e.g., as discussed above). In such embodiments, the plurality of lasers in the excitation module are time-multiplexed. As such, in embodiments, laser light from the excitation module is conveyed over the fiber optic light conveyor such that beams from each laser are transmitted in an alternating pattern.

Flow cytometers of interest may also include one or more fiber optic light conveyors. In certain embodiments, the fiber optic light conveyor is configured to convey excitation wavelength light from the light source to the flow cell at a focal spot. In some embodiments, the fiber optic light conveyor includes a transparent material such as a glass material including, but not limited to, silica (e.g., fused silica). In other embodiments, the transparent material includes a polymeric material. In such embodiments, the transparent material may include one or more materials such as, but not limited to, poly(methyl-methacrylate) (PMMA), polystyrene, and poly(perfluoro-butenyl vinyl ether) (CYTOP). In some embodiments, the fiber optic light collector is a single-mode fiber. In other instances, the fiber optic light collector is a multi-mode fiber. The diameter of the fiber optic light conveyor may vary as desired. In some embodiments, the diameter of the subject fiber optic light conveyor ranges from 0.1 mm to 3 mm, such as 0.2 mm to 2.5 mm, 0.3 mm to 2.2 mm, 0.4 mm to 2 mm. 0.5 mm to 1.5 mm, and including 0.6 mm to 1.2 mm. In certain embodiments, the subject flow cytometers include a single fiber optic light conveyor. In embodiments where the light source is an excitation module, the single fiber optic light conveyor may convey time-multiplexed light signals from the plurality of lasers in the excitation module. In other embodiments, flow cytometers include multiple fiber optic light conveyors. For example, flow cytometers of interest may include a fiber optic light conveyor for each focal spot and/or focusing optical assembly present in the integrated light interrogation module, i.e., such that each focal spot is irradiated with light conveyed by a different fiber optic light conveyor. As such, flow cytometers may include one or more fiber optic light conveyors, such as two or more, three or more, four or more, five or more, and including six or more.

Flow cytometers of interest may additionally include one or more fiber optic light collection elements. In certain embodiments, the fiber optic light collection element is configured to collect fluorescent light emitted by the particles transported through the focal spot after those particles have been irradiated with excitation wavelength light. In some embodiments, the fiber optic light collection element includes a transparent material such as a glass material including, but not limited to, silica (e.g., fused silica). In other embodiments, the transparent material includes a polymeric material. In such embodiments, the transparent material may include one or more materials such as, but not limited to, poly(methyl-methacrylate) (PMMA), polystyrene, and poly(perfluoro-butenyl vinyl ether) (CYTOP). In some embodiments, the fiber optic light collection element is a single-mode fiber. In other instances, the fiber optic light collection element is a multi-mode fiber. The diameter of the fiber optic light conveyor may vary as desired. In some embodiments, the diameter of the subject fiber optic light conveyor ranges from 0.1 mm to 3 mm, such as 0.2 mm to 2.5 mm, 0.3 mm to 2.2 mm, 0.4 mm to 2 mm. 0.5 mm to 1.5 mm, and including 0.6 mm to 1.2 mm. In some embodiments, the subject flow cytometers include a single fiber optic light collection element. In embodiments where the light source is an excitation module, the single fiber optic light conveyor may convey time-multiplexed light signals from the flow cell to one or more detectors. In other embodiments, flow cytometers include multiple fiber optic light collection elements. For example, flow cytometers of interest may include a fiber optic light collection element for each focal spot and/or focusing optical assembly present in the integrated light interrogation module. As such, flow cytometers may include one or more fiber optic light collection elements, such as two or more, three or more, four or more, five or more, and including six or more.

In embodiments, the subject flow cytometers also include a fluorescent light detector configured to detect one or more fluorescent wavelengths of light. In other embodiments, flow cytometers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject flow cytometers include multiple fluorescent light detectors, each fluorescent light detector may be the same, or the collection of fluorescent light detectors may be a combination of different types of detectors. For example, where the subject flow cytometers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the flow cell and the one or more fluorescent light detectors. Light dispersion devices of interest include but are not limited to, colored glass, bandpass filters, interference filters, dichroic mirrors, diffraction gratings, monochromators and combinations thereof, among other wavelength separating devices.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, flow cytometers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, flow cytometers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

Certain embodiments of the invention further include a side scatter detector configured to detect side scatter wavelengths of light (e.g., light refracted and reflected from the surfaces and internal structures of the particle). In other embodiments, flow cytometers include multiple side scatter detectors, such as 2 or more, such as 3 or more, such as 4 or more, and including 5 or more.

Any convenient detector for detecting collected light may be used in the side scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject flow cytometers include multiple side scatter detectors, each side scatter detector may be the same, or the collection of side scatter detectors may be a combination of different types of detectors. For example, where the subject flow cytometers include two side scatter detectors, in some embodiments the first side scatter detector is a CCD-type device and the second side scatter detector (or imaging sensor) is a CMOS-type device. In other embodiments, both the first and second side scatter detectors are CCD-type devices. In yet other embodiments, both the first and second side scatter detectors are CMOS-type devices. In still other embodiments, the first side scatter detector is a CCD-type device and the second side scatter detector is a photomultiplier tube (PMT). In still other embodiments, the first side scatter detector is a CMOS-type device and the second side scatter detector is a photomultiplier tube. In yet other embodiments, both the first and second side scatter detectors are photomultiplier tubes.

Embodiments of the invention also include a light dispersion/separator module positioned between the flow cell and the side scatter detector. Light dispersion devices of interest include but are not limited to, colored glass, bandpass filters, interference filters, dichroic mirrors, diffraction gratings, monochromators and combinations thereof, among other wavelength separating devices.

Aspects of the flow cytometers also include a forward scatter detector configured to detect forward scattered light. The number of forward scatter detectors in the subject flow cytometers may vary, as desired. For example, the subject flow cytometers may include 1 forward scatter detector or multiple forward scatter detectors, such as 2 or more, such as 3 or more, such as 4 or more, and including 5 or more. In certain embodiments, flow cytometers include 1 forward scatter detector. In other embodiments, flow cytometers include 2 forward scatter detectors Any convenient detector for detecting collected light may be used in the forward scatter detector described herein. Detectors of interest include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the flow cytometers include multiple forward scatter detectors, each detector may be the same, or the collection of detectors may be a combination of different types of detectors. For example, where the subject flow cytometers include two forward scatter detectors, in some embodiments the first forward scatter detector is a CCD-type device and the second forward scatter detector (or imaging sensor) is a CMOS-type device. In other embodiments, both the first and second forward scatter detectors are CCD-type devices. In yet other embodiments, both the first and second forward scatter detectors are CMOS-type devices. In still other embodiments, the first forward scatter detector is a CCD-type device and the second forward scatter detector is a photomultiplier tube (PMT). In still other embodiments, the first forward scatter detector is a CMOS-type device and the second forward scatter detector is a photomultiplier tube. In yet other embodiments, both the first and second forward scatter detectors are photomultiplier tubes.

In embodiments, the forward scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Embodiments of the invention also include a light dispersion/separator module positioned between the flow cell and the forward scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the flow cell and the forward scatter detector. In other embodiments, more than one bandpass filter is positioned between the flow cell and the forward scatter detector, such as, for example, 2 or more, 3 or more, 4 or more, and including 5 or more. In embodiments, the bandpass filters have a minimum bandwidth ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. wavelengths and reflects light with other wavelengths to the forward scatter detector.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Prac-*

*tical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5): 502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 4:
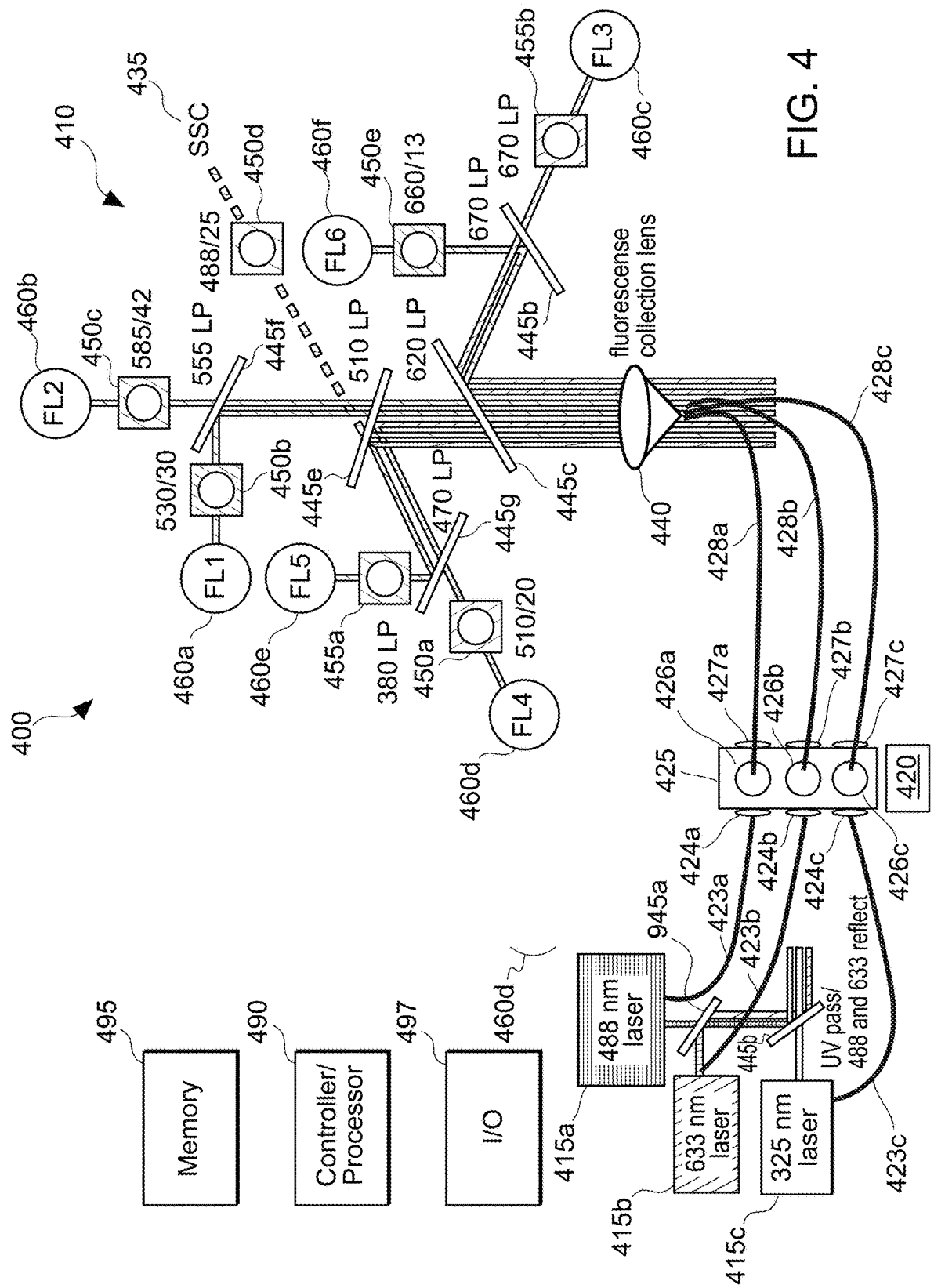
FIG. 4 depicts a flow cytometer including an integrated light interrogation module according to certain embodiments.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, an integrated light interrogation module 420, a side scatter detector 435, a fluorescence collection lens 440, one or more beam splitters 445c-445g, one or more bandpass filters 450a-450e, one or more longpass ("LP") filters 455a-455b, and one or more fluorescent light detectors 460a-460f.

The excitation lasers 415a-c emit light in the form of a laser beam. The wavelengths of the laser beams emitted from excitation lasers 415a-415c are 488 nm, 633 nm, and 325 nm, respectively, in the example system of FIG. 4. Light emitted by each of lasers 415a-c is conveyed by fiber optic light conveyors 423a, 423b and 423c, respectively, to an integrated light interrogation module 420. The integrated light interrogation module includes a flow cell 425, three focusing optical assemblies having first lenses in the direction of excitation 424a-c, second lenses in the direction of excitation 427a-c, and lenses in the direction of fluorescent light collection 426a-c. Not shown are second lenses in the direction of fluorescent light collection that are located behind flow cell 425. Excitation wavelength light conveyed by fiber optic light conveyors 423a-c is focused onto respective focal spots within flow cell 425 via first lenses in the direction of excitation 424a-c. Second lenses in the direction of excitation 427a-c are coated with a reflective material configured to reflect excitation light back to the focal spot. In the example of FIG. 4, lenses in the direction of fluorescent light collection 426a-c are arranged orthogonally on the flow cell with respect to the first lenses in the direction of excitation 424a-c. The light from the laser beams interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. After fluorescent light is produced, it is focused by lenses in the direction of fluorescent light collection 426a-c and collected by fiber optic light collection elements 428a-c The fluorescence emissions as well as the diffracted light, refracted light, reflected light, and scattered light may be routed by fiber optic light collection elements 428a-c to one or more of the side scatter detector 435, and the one or more fluorescent light detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye. Beam splitters direct light of different wavelengths in different directions. Beam splitters can be characterized by filter properties such as shortpass and longpass. In one embodiment, the beam splitters 445a-445g can comprise optical mirrors, such as dichroic mirrors.

The side scatter detector 435 is configured to detect refracted and reflected light from the surfaces and internal structures of the particle that tends to increase with increasing particle complexity of structure. The fluorescence emissions from fluorescent molecules associated with the particle can be detected by the one or more fluorescent light detectors 460a-460f. The side scatter detector 435 and fluorescent light detectors can include photomultiplier tubes. The signals detected at the side scatter detector 435 and the fluorescent detectors can be converted to electronic signals (voltages) by the detectors. This data can provide information about the sample.

In operation, cytometer operation is controlled by a controller/processor 490, and the measurement data from the detectors can be stored in the memory 495 and processed by the controller/processor 490. Although not shown explicitly, the controller/processor 490 is coupled to the detectors to receive the output signals therefrom, and may also be coupled to electrical and electromechanical components of the flow cytometer 410 to control the lasers, fluid flow parameters, and the like.

Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In some embodiments, the subject flow cytometers include one or more detection modules. In some embodiments, the subject detection module is a modular unit in which multiple detectors (e.g., such as those described above) are co-located in a single unit. In some embodiments, the detection module includes a clustered wavelength division light detection system such as those described in U.S. Provisional Patent Application Ser. No. 62/971,840 filed Feb. 7, 2020, the disclosure of which is incorporated herein. Clustered wavelength division light detection systems of interest possess three or more wavelength separators that pass light having a predetermined spectral range and separate detected light into spectral ranges and require fewer reflections of the light in order to generate a plurality of sub-spectral ranges detected by photodetectors in the subject systems. In certain instances, the wavelength separator is a prism or a diffraction grating. In some embodiments, the wavelength separators are configured to convey light between each other. The wavelength separators may be positioned along a single plane or along two or more parallel planes. In certain embodiments, the wavelength separators are positioned in a polygonal configuration, such as a pentagonal or hexagonal configuration. In embodiments, the wavelength separators are configured to pass light of a predetermined spectral range. In some embodiments, the wavelength separators are configured to pass light having wavelengths that range from 200 nm to 1200 nm, such as from 360 nm to 960 nm. In some embodiments, the wavelength separators are each configured to pass light having a spectral range that spans from 75 nm to 150 nm. In certain instances, the wavelength separators are each configured to pass light having a spectral range that spans 100 nm (e.g., pass light having wavelengths that range from 360 nm to 460 nm).

Clustered wavelength division light detection systems may include one or more light detection modules in optical communication with each wavelength separator. In embodiments, each light detection module includes a plurality of photodetectors and an optical component configured to convey light having a predetermined sub-spectral range to the photodetectors. In some embodiments, each optical component is configured to pass light having a sub-spectral range of from 5 nm to 50 nm to each photodetector, such as a sub-spectral range of about 20 nm to each photodetector. The photodetectors and optical components may be positioned in each light detection module along a single plane or along two or more parallel planes. In certain embodiments, the photodetectors and optical components are positioned in a polygonal configuration, such as a hexagonal, heptagonal or octagonal configuration in each light detection module.

Figure 5:
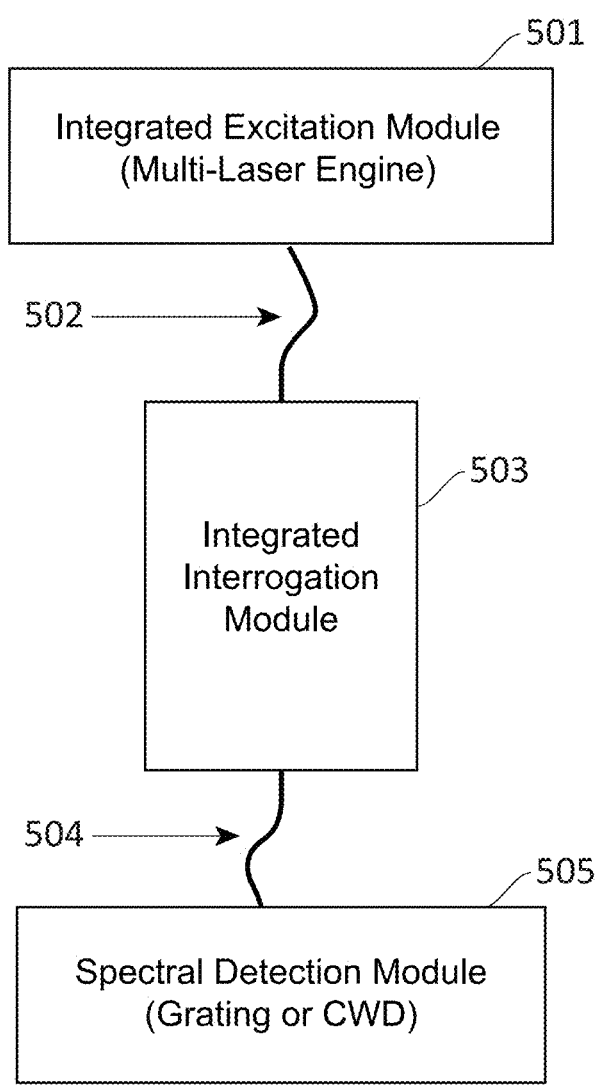
FIG. 5 depicts a schematic block diagram including an excitation module, an integrated light interrogation module and a detection module.

FIG. 5 depicts a flow cytometric system according to one embodiment of the invention. As shown in FIG. 5, excitation module 501 includes a plurality of lasers and is connected via fiber optic light conveyor 502 to integrated light interrogation module 503. Signals from the excitation module are time-multiplexed over fiber optic light conveyor 502. Fluorescent light resulting from the irradiation of particles passing through the flow cell of integrated light interrogation module 503 is collected by fiber optic light collection element 504 and conveyed to detection module 505 where the signals are de-multiplexed and detected.

Figure 6:
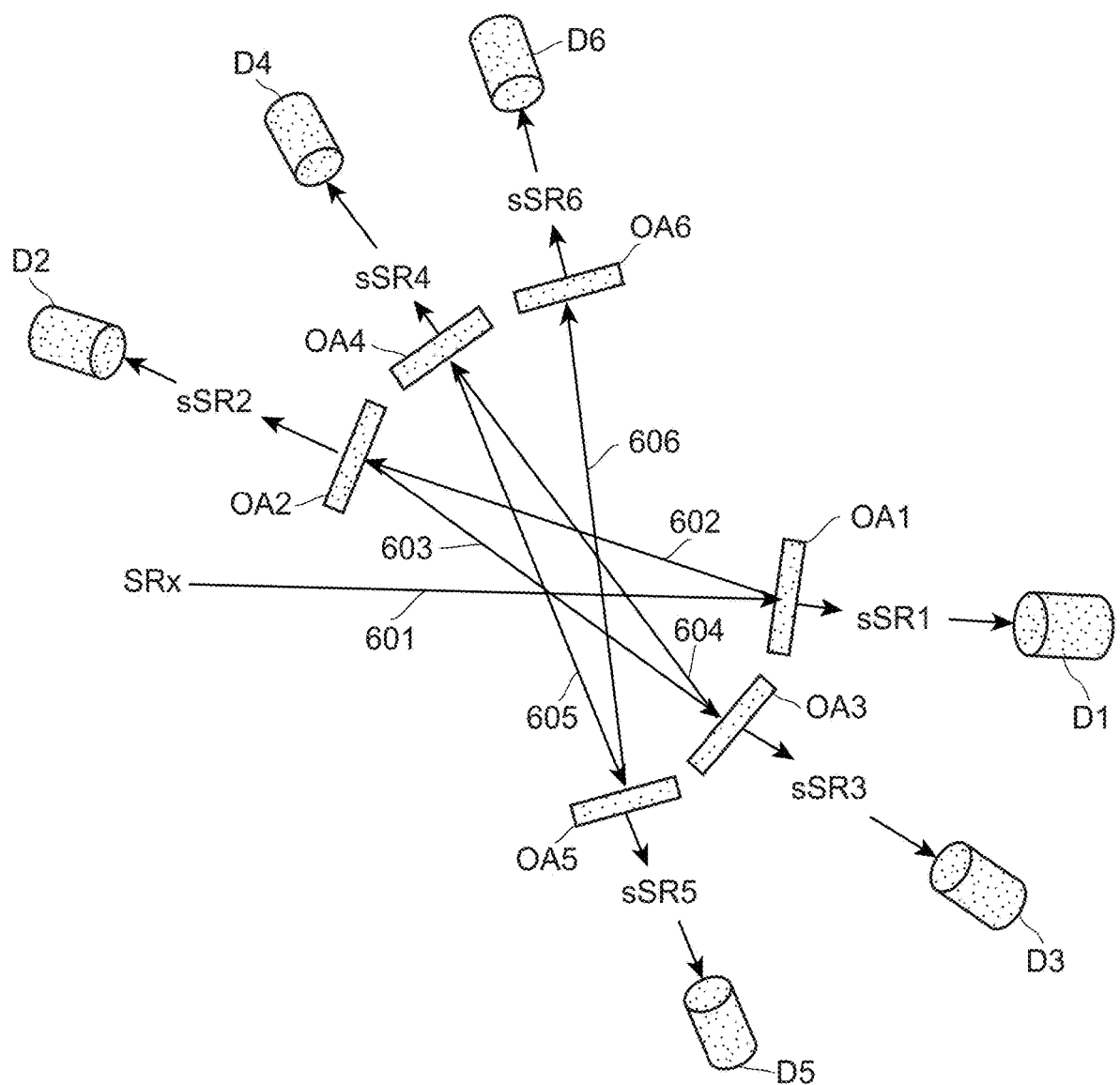
FIG. 6 depicts one embodiment of a clustered wavelength division light detection module.

FIG. 6 depicts components of a clustered wavelength division light detection module positioned in a polygonal configuration that may, in some embodiments, be employed as the detection module discussed above and in FIG. 5. A spectral range of light SRx from a wavelength separator (as described above) having a set of wavelengths 601 (e.g., 200 nm to 500 nm) is conveyed to a first optical component OA1 configured to pass a first sub-spectral range of light sSR1 (e.g., 200 nm to 250 nm) and convey light having a set of wavelengths 602 (e.g., 250 nm to 500 nm) to a second optical component OA2. The first sub-spectral range of light sSR1 is conveyed to a first photodetector D1. The second optical component OA2 is configured to pass a second sub-spectral range of light sSR2 (e.g., 250 nm to 300 nm)

and convey light having a set of wavelengths 603 (e.g., 300 nm to 500 nm) to a third optical component OA3. The second sub-spectral range of light sSR2 is conveyed to a second photodetector D2. The third optical component OA3 is configured to pass a third sub-spectral range of light sSR3 (e.g., 300 nm to 350 nm) and convey light having a set of wavelengths 604 (e.g., 350 nm to 500 nm) to a fourth optical component OA4. The third sub-spectral range of light sSR3 is conveyed to a third photodetector D3. The fourth optical component OA4 is configured to pass a fourth sub-spectral range of light sSR4 (e.g., 350 nm to 400 nm) and convey light having a set of wavelengths 605 (e.g., 400 nm to 500 nm) to a fifth optical component OA5. The fourth sub-spectral range of light sSR4 is conveyed to a fourth photodetector D4. The fifth optical component OA5 is configured to pass a fifth sub-spectral range of light sSR5 (e.g., 400 nm to 450 nm) and convey light having a set of wavelengths 606 (e.g., 450 nm to 500 nm) to a sixth optical component OA6. The fifth sub-spectral range of light sSR5 is conveyed to a fifth photodetector D5. The sixth optical component OA6 is configured to pass a sixth sub-spectral range of light sSR6 (e.g., 450 nm to 500 nm). The sixth sub-spectral range of light sSR6 is conveyed to a sixth photodetector D6. In this embodiment, light is conveyed along a star-shaped light path.

Figure 7:
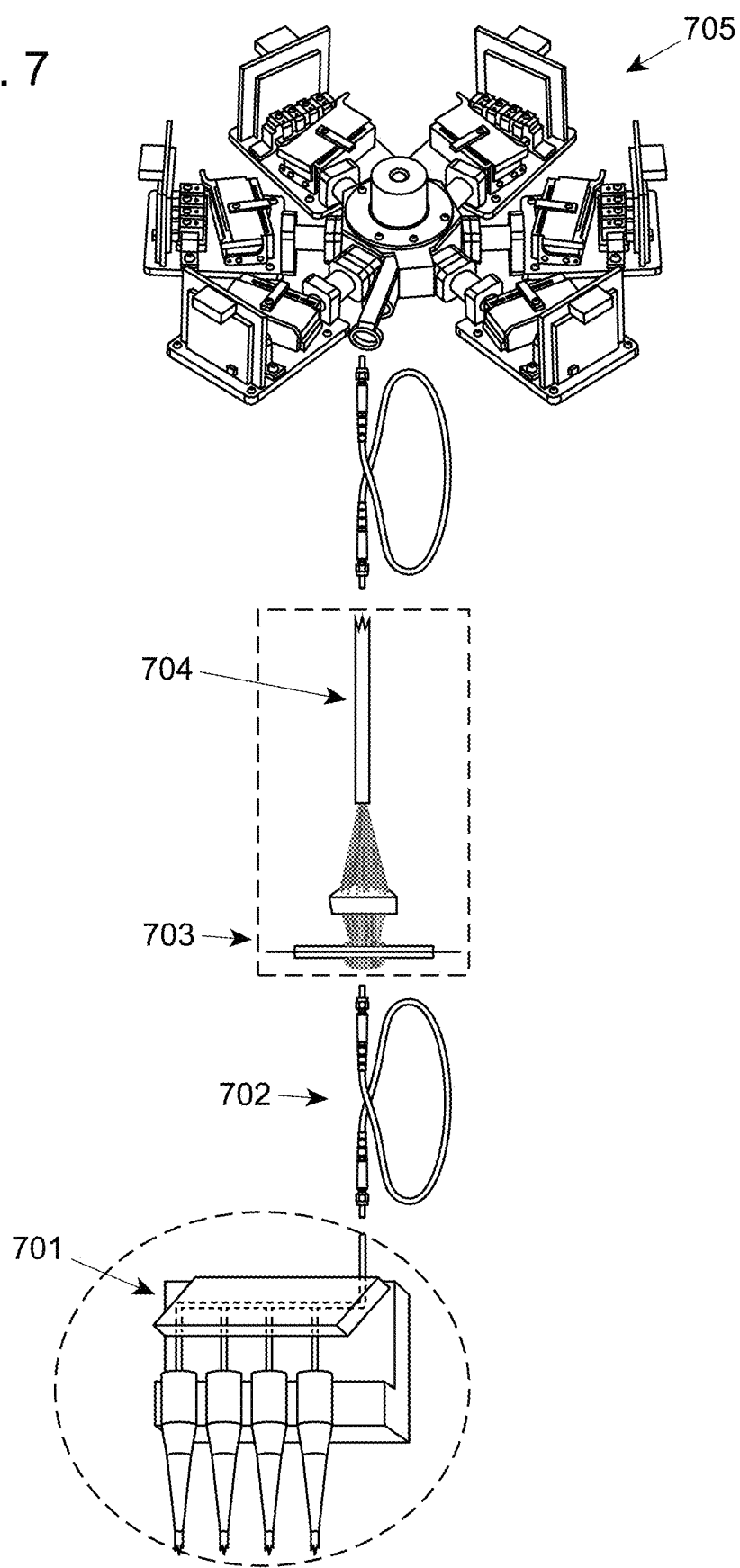
FIG. 7 depicts a flow cytometric system including an excitation module, an integrated light interrogation module and a detection module according to certain embodiments.

FIG. 7 presents an alternative depiction of the flow cytometric system presented in FIG. 5. As shown in FIG. 7, excitation module 701 is connected via fiber optic light conveyor 702 to integrated light interrogation module 703. Signals from the excitation module are time-multiplexed over fiber optic light conveyor 702. Fluorescent light resulting from the irradiation of particles passing through the flow cell of integrated light interrogation module 703 is collected by fiber optic light collection element 704 and conveyed to detection module 705 where the signals are de-multiplexed and detected.

Further details regarding modular light detection units which may be employed in embodiments of the invention may be found in U.S. application Ser. No. 17/159,453 titled "Clustered Wavelength Division Light Detection Systems And Methods of Using The Same," and filed on Jan. 27, 2021, the disclosure of which is herein incorporated by reference.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflector plates, such as described in U.S. Patent Publication No. 2017/0299493, filed on Mar. 28, 2017, the disclosure of which is incorporated herein by reference.

Figure 8:
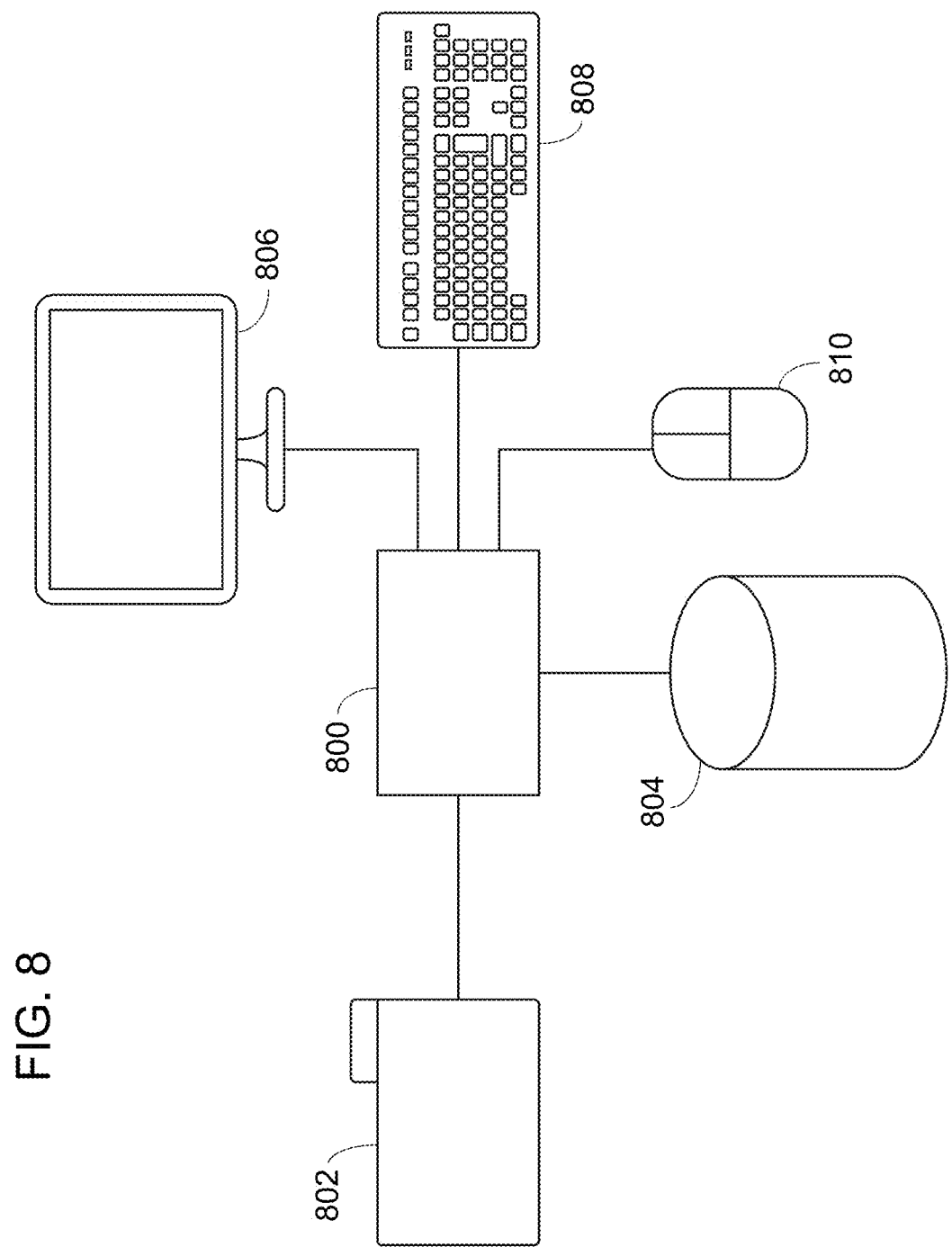
FIG. 8 depicts a functional block diagram for one example of a sorting control system according to certain embodiments.

FIG. 8 shows a functional block diagram for one example of a sorting control system, such as a processor 800, for analyzing and displaying biological events. A processor 800 can be configured to implement a variety of processes for controlling graphic display of biological events.

A flow cytometer or sorting system 802 can be configured to acquire biological event data. For example, a flow cytometer can generate flow cytometric event data. The flow cytometer 802 can be configured to provide biological event data to the processor 800. A data communication channel can be included between the flow cytometer 802 and the processor 800. The biological event data can be provided to the processor 800 via the data communication channel.

The processor 800 can be configured to receive biological event data from the flow cytometer 802. The biological event data received from the flow cytometer 802 can include flow cytometric event data. The processor 800 can be configured to provide a graphical display including a first plot of biological event data to a display device 806. The processor 800 can be further configured to render a region of interest as a gate around a population of biological event data shown by the display device 806, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 800 can be further configured to display the biological event data on the display device 806 within the gate differently from other events in the biological event data outside of the gate. For example, the processor 800 can be configured to render the color of biological event data contained within the gate to be distinct from the color of biological event data outside of the gate. The display device 806 can be implemented as a monitor, a tablet computer, a smartphone, or other electronic device configured to present graphical interfaces.

The processor 800 can be configured to receive a gate selection signal identifying the gate from a first input device. For example, the first input device can be implemented as a mouse 810. The mouse 810 can initiate a gate selection signal to the processor 800 identifying the gate to be displayed on or manipulated via the display device 806 (e.g., by clicking on or in the desired gate when the cursor is positioned there). In some implementations, the first device can be implemented as the keyboard 808 or other means for providing an input signal to the processor 800 such as a touchscreen, a stylus, an optical detector, or a voice recognition system. Some input devices can include multiple inputting functions. In such implementations, the inputting functions can each be considered an input device. For example, as shown in FIG. 8, the mouse 810 can include a right mouse button and a left mouse button, each of which can generate a triggering event.

The triggering event can cause the processor 800 to alter the manner in which the data is displayed, which portions of the data is actually displayed on the display device 806, and/or provide input to further processing such as selection of a population of interest for particle sorting.

In some embodiments, the processor 800 can be configured to detect when gate selection is initiated by the mouse 810. The processor 800 can be further configured to automatically modify plot visualization to facilitate the gating process. The modification can be based on the specific distribution of biological event data received by the processor 800.

The processor 800 can be connected to a storage device 804. The storage device 804 can be configured to receive and store biological event data from the processor 800. The storage device 804 can also be configured to receive and store flow cytometric event data from the processor 800. The storage device 804 can be further configured to allow retrieval of biological event data, such as flow cytometric event data, by the processor 800.

The display device 806 can be configured to receive display data from the processor 800. The display data can comprise plots of biological event data and gates outlining sections of the plots. The display device 806 can be further configured to alter the information presented according to input received from the processor 800 in conjunction with input from the flow cytometer 802, the storage device 804, the keyboard 808, and/or the mouse 810.

In some implementations the processor 800 can generate a user interface to receive example events for sorting. For example, the user interface can include a control for receiving example events or example images. The example events or images or an example gate can be provided prior to collection of event data for a sample or based on an initial set of events for a portion of the sample.

Figure 9A:
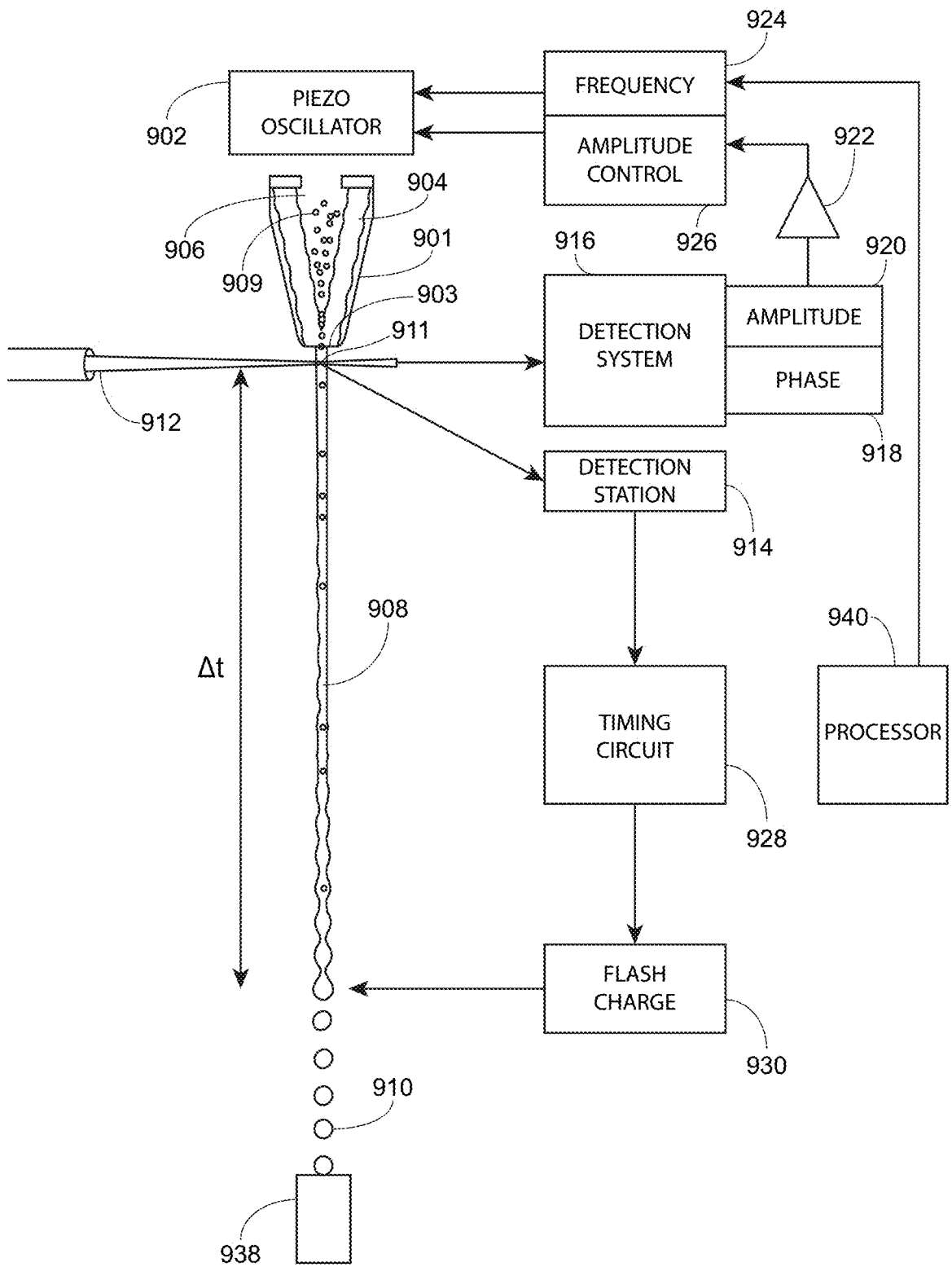
FIGS. 9A-B depict schematic drawings of a particle sorter system according to certain embodiments.

FIG. 9A is a schematic drawing of a particle sorter system 900 (e.g., the flow cytometer 902) in accordance with one embodiment presented herein. In some embodiments, the particle sorter system 900 is a cell sorter system. As shown in FIG. 9A, a drop formation transducer 902 (e.g., piezo-oscillator) is coupled to a fluid conduit 901, which can be coupled to, can include, or can be, a nozzle 903. Within the fluid conduit 901, sheath fluid 904 hydrodynamically focuses a sample fluid 906 comprising particles 909 into a moving fluid column 908 (e.g. a stream). Within the moving fluid column 908, particles 909 (e.g., cells) are lined up in single file to cross a monitored area 911 (e.g., where laser-stream intersect), irradiated by an irradiation source 912 (e.g., a laser). Vibration of the drop formation transducer 902 causes moving fluid column 908 to break into a plurality of drops 910, some of which contain particles 909.

In operation, a detection station 914 (e.g., an event detector) identifies when a particle of interest (or cell of interest) crosses the monitored area 911. Detection station 914 feeds into a timing circuit 928, which in turn feeds into a flash charge circuit 930. At a drop break off point, informed by a timed drop delay (Δt), a flash charge can be applied to the moving fluid column 908 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 9A, the drops can be collected in a drain receptacle 938.

A detection system 916 (e.g. a drop boundary detector) serves to automatically determine the phase of a drop drive signal when a particle of interest passes the monitored area 911. An exemplary drop boundary detector is described in U.S. Pat. No. 7,679,039, which is incorporated herein by reference in its entirety. The detection system 916 allows the instrument to accurately calculate the place of each detected particle in a drop. The detection system 916 can feed into an amplitude signal 920 and/or phase 918 signal, which in turn feeds (via amplifier 922) into an amplitude control circuit 926 and/or frequency control circuit 924. The amplitude control circuit 926 and/or frequency control circuit 924, in turn, controls the drop formation transducer 902. The amplitude control circuit 926 and/or frequency control circuit 924 can be included in a control system.

In some implementations, sort electronics (e.g., the detection system 916, the detection station 914 and a processor 940) can be coupled with a memory configured to store the detected events and a sort decision based thereon. The sort decision can be included in the event data for a particle. In some implementations, the detection system 916 and the detection station 914 can be implemented as a single detection unit or communicatively coupled such that an event measurement can be collected by one of the detection system 916 or the detection station 914 and provided to the non-collecting element.

Figure 9B:
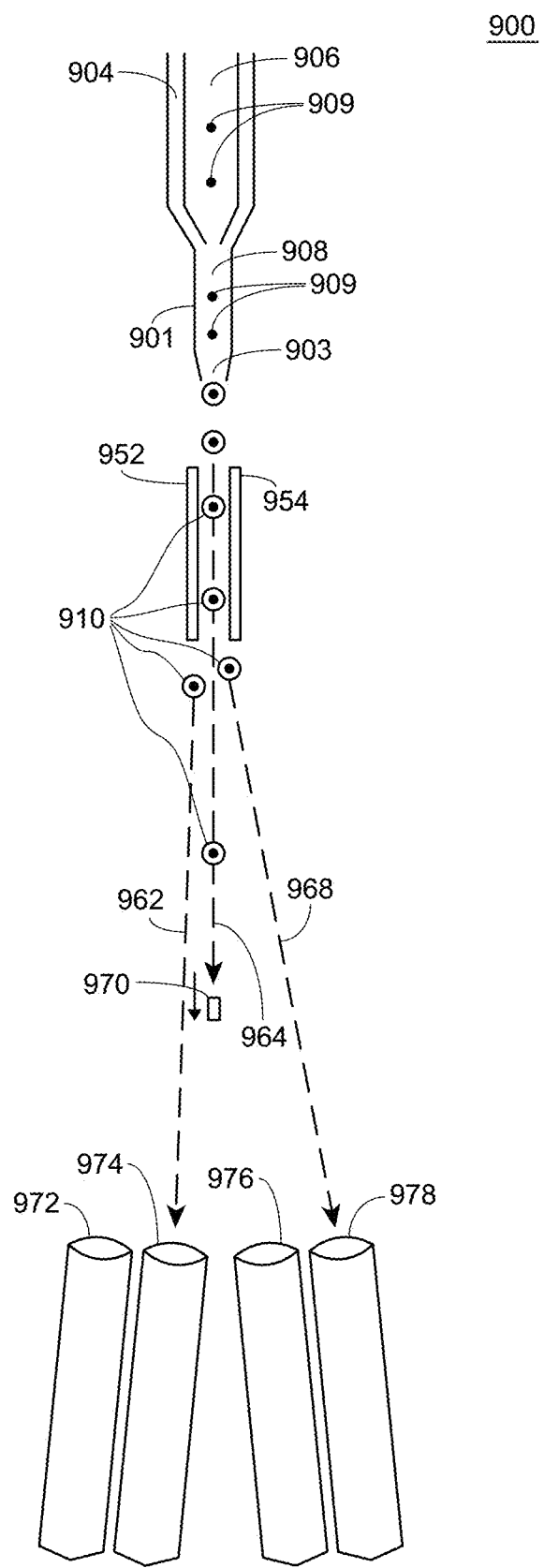

FIG. 9B is a schematic drawing of a particle sorter system, in accordance with one embodiment presented herein. The particle sorter system 900 shown in FIG. 9B, includes deflection plates 952 and 954. A charge can be applied via a stream-charging wire in a barb. This creates a stream of droplets 910 containing particles 910 for analysis. The particles can be illuminated with one or more light sources (e.g., lasers) to generate light scatter and fluorescence information. The information for a particle is analyzed such as by sorting electronics or other detection system (not shown in FIG. 9B). The deflection plates 952 and 954 can be independently controlled to attract or repel the charged droplet to guide the droplet toward a destination collection receptacle (e.g., one of 972, 974, 976, or 978). As shown in FIG. 9B, the deflection plates 952 and 954 can be controlled to direct a particle along a first path 962 toward the receptacle 974 or along a second path 968 toward the receptacle 978. If the particle is not of interest (e.g., does not exhibit scatter or illumination information within a specified sort range), deflection plates may allow the particle to continue along a flow path 964. Such uncharged droplets may pass into a waste receptacle such as via aspirator 970.

The sorting electronics can be included to initiate collection of measurements, receive fluorescence signals for particles, and determine how to adjust the deflection plates to cause sorting of the particles. Example implementations of the embodiment shown in FIG. 9B include the BD FACSAria™ line of flow cytometers commercially provided by Becton, Dickinson and Company (Franklin Lakes, NJ).

Methods of Analyzing a Sample in a Flow Cytometer Including an Integrated Light Interrogation Module Aspects of the present disclosure include methods for analyzing a sample in a flow cytometer having a light source, a fiber optic light conveyor optically coupled to the light source and an integrated light interrogation module (e.g., as described above). In embodiments, the integrated light interrogation module includes a flow cell comprising a light-accessible flow channel for transporting particles in a flow stream, a focusing optical assembly integrated with the flow cell, and a connector for operably attaching a fiber optic light conveyor to the focusing optical assembly. In certain instances, the focusing optical assembly is configured to project excitation wavelength light from the fiber optic light conveyor onto a focal spot of the flow cell when the fiber optic light conveyor is operably attached to the connector. Methods of assembling such a flow cytometer are also provided.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses In certain embodiments, methods include irradiating the sample in a flow cell integrated with a focusing optical assembly. As discussed above, the focusing optical assembly described herein may be configured to project excitation wavelength light from the light source onto a focal spot of the flow cell. Any convenient optical element may be employed in the subject focusing optical assembly. For example, the focusing optical assembly may include one or more prisms for refracting light from a light source and directing the light to a focal spot in the interrogation zone of the flow cell. In certain embodiments, the focusing optical assembly may include one or more lenses. In embodiments, the focusing optical assembly may include any convenient number of lenses, such as 1 to 10 lenses, 2 to 5 lenses, and including 2 to 4 lenses. In some embodiments, the focusing optical assembly includes 2 lenses. In other embodiments, the focusing optical assembly includes 4 lenses. In certain embodiments, one or more lenses in the focusing optical assembly are micro-lenses. In such embodiments, the subject micro-lenses may be of any convenient size and shape. In some instances, focusing optical assembly includes micro-lenses having a diameter ranging from 10 μm to 5 mm, such as 50 μm to 2 mm and including 100 μm to 1 mm. In some cases, the subject micro-lenses are spherically shaped. In embodiments, the micro-lenses possess a plane surface on one side and a spherical (e.g., convex) surface on the other. In additional embodiments, the micro-lenses are aspheric lenses, i.e., lenses possessing dimensions that are not spherical or cylindrical. In embodiments of the focusing optical assembly including multiple micro-lenses, each micro-lens in the focusing optical assembly may be the same or different. For example, the micro-lenses may possess different sizes and/or shapes as desired for focusing excitation wavelength light onto a focal spot of the flow cell.

In embodiments where the subject focusing optical assembly includes a plurality of lenses, a subset of lenses may be positioned such that excitation wavelength light and/or fluorescent is back-reflected through the flow cell. In such instances, one or more lenses may be coated with a reflective material.

As discussed above, the focusing optical assembly may be integrated with the flow cell by any convenient means. For example, the focusing optical assembly may be attached to an outer surface of the flow cell. In such embodiments, the focusing optical assembly may be attached via an adhesive. In other embodiments, the focusing optical assembly is embedded in the flow cell, e.g., press fit. In embodiments of the invention in which the flow cell is surrounded by a housing, the focusing optical assembly may in some cases be embedded (e.g., press fit) in the housing.

Embodiments of the method also include operably attaching a fiber optic light conveyor to the focusing optical assembly. In certain embodiments, the fiber optic light conveyor is configured to convey excitation wavelength light from the light source to the flow cell at a focal spot. The fiber optic light conveyor connector may operably attach the fiber optic light conveyor to the focusing optical assembly via any convenient mechanism. In some embodiments, the connector may operably attach a fiber optic light conveyor to the focusing optical assembly such that the fiber optic light conveyor requires little, if any, optical adjustment to ensure proper alignment with the flow cell. In such embodiments, the connector may be located adjacent to the focusing optical assembly such that when a fiber optic light conveyor is operably attached thereto, the fiber optic light conveyor is optically aligned with the focusing optical assembly and focal spot such that excitation wavelength light is projected onto the focal spot in an optimal manner. In some embodiments, the fiber optic light conveyor connector may physically couple the fiber optic light conveyor to the focusing optical assembly, such as with an adhesive. In other embodiments, the fiber optic light conveyor connector is configured to releasably attach the fiber optic light conveyor to the focusing optical assembly. In such embodiments, the fiber optic light conveyor connector may include one or more clamps, magnets, latches, notches, countersinks, counterbores, grooves, pins, tethers, hinges, or combinations thereof. In some cases where the integrated light interrogation module includes a housing, the fiber optic light conveyor connector may be attached to the housing so that the fiber optic light conveyor may transmit excitation wavelength light therethrough.

In additional embodiments, methods include operably attaching a fiber optic light collection element to the focusing optical assembly. In such embodiments, the fiber optic light collection element is configured to collect fluorescent light emitted by the particles transported through the focal spot after those particles have been irradiated with excitation wavelength light. The fiber optic light collection element connector may operably attach the fiber optic light collection element to the focusing optical assembly via any convenient mechanism. In some embodiments, the fiber optic light collection element connector may operably attach a fiber optic light collection element to the focusing optical assembly such that the fiber optic light collection element requires little, if any, optical adjustment to ensure proper optical alignment with the flow cell. In such embodiments, the fiber optic light collection element connector may be located adjacent to the focusing optical assembly such that when a fiber optic light conveyor is operably attached thereto, the fiber optic light collection element is optically aligned with the focusing optical assembly and focal spot such that fluorescent light is directed from the focal spot and collected by the fiber optic light collection element. In some embodiments, the fiber optic light collection element connector may physically couple the fiber optic light collection element to the focusing optical assembly, such as with an adhesive. In other embodiments, the fiber optic light collection element connector is configured to releasably attach the fiber optic light collection element to the focusing optical assembly. In such embodiments, the fiber optic light collection element connector may include one or more clamps, magnets, latches, notches, countersinks, counter-bores, grooves, pins, tethers, hinges, or combinations thereof. In some cases where the integrated light interrogation module includes a housing, the fiber optic light collection element connector may be attached to the housing so that the fiber optic light collection element may transmit excitation wavelength light therethrough.

In embodiments of the method including both a fiber optic light conveyor connector and a fiber optic light collection element connector, the fiber optic light conveyor connector and fiber optic light collection element may assume any convenient position relative to one another with respect to the flow cell. In some embodiments, the fiber optic light collection element connected is attached to the focusing optical assembly on the opposite side of the integrated light interrogation module with respect to the fiber optic light conveyor connector. In other embodiments, the fiber optic light collection element connector is attached to the focusing optical assembly orthogonally with respect to the fiber optic light conveyor connector. In some cases, the focusing optical assembly may be configured to direct fluorescent light from the focal spot of the flow cell to the fiber optic light collection element when such is operably attached (e.g., as described above). In these cases, components of the focusing optical assembly (e.g., lenses) may be integrated with the flow cell such that light is projected on the focal spot and collected therefrom in accordance with the positioning of the fiber optic light conveyor connector and fiber optic light collection element connector.

Where the subject methods include multiple focusing optical assemblies, methods may also include operably attaching fiber optic light conveyors and fiber optic light collection elements to each of the focusing optical assemblies. In such embodiments, each focusing optical assembly may be arranged with respect to adjacent focusing optical assemblies along the length of the flow cell in any convenient manner. For example, in some cases, each of the fiber optic light conveyor connectors associated with each of the plurality of focusing optical assemblies is arranged orthogonally with respect to one or more adjacent fiber optic light conveyor connectors. This may result in a "staggered" pattern in which fiber optic light conveyor connectors are arranged along different sides of the flow cell in an alternating fashion. In other cases, each of the fiber optic light conveyor connectors is arranged on the same side of the flow cell. In such cases, each fiber optic light conveyor connector is located on the same side of the flow cell.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for analyzing flow cytometer data collected from a flow cytometer including an integrated light interrogation module comprising a flow cell comprising a light-accessible flow channel for transporting particles in a flow stream, a focusing optical assembly integrated with the flow cell, and a connector for operably attaching a fiber optic light conveyor to the focusing optical assembly.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, Windows 10, iOS, macOS, Linux, OS/400, Android, SGI IRIX, Siemens Reliant Unix, Oracle Solaris and others.

Figure 10:
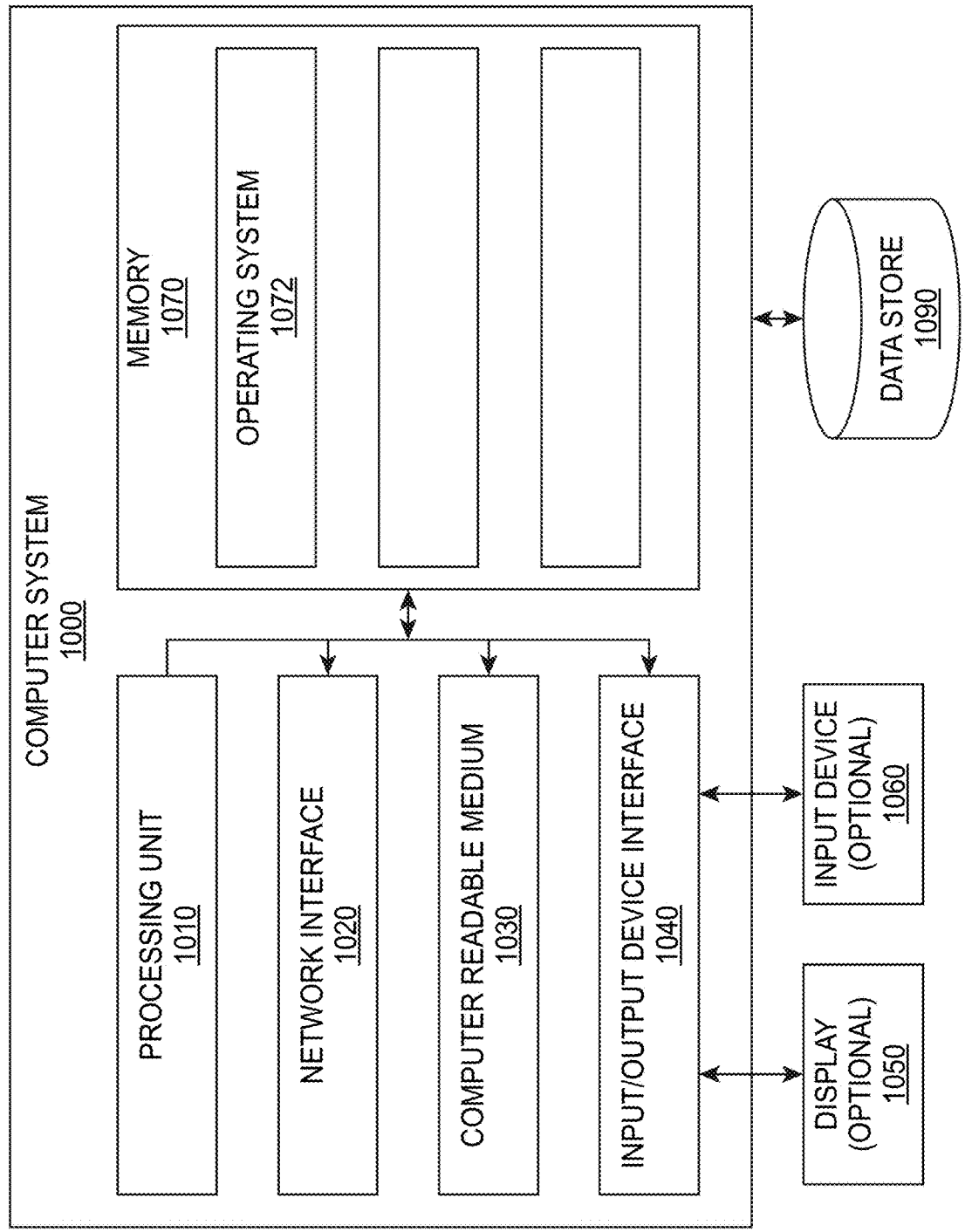
FIG. 10 depicts a block diagram of a computing system according to certain embodiments.

FIG. 10 depicts a general architecture of an example computing device 1000 according to certain embodiments. The general architecture of the computing device 1000 depicted in FIG. 10 includes an arrangement of computer hardware and software components. It is not necessary, however, that all of these generally conventional elements be shown in order to provide an enabling disclosure. As illustrated, the computing device 1000 includes a processing unit 1010, a network interface 1020, a computer readable medium drive 1030, an input/output device interface 1040, a display 1050, and an input device 1060, all of which may communicate with one another by way of a communication bus. The network interface 1020 may provide connectivity to one or more networks or computing systems. The processing unit 1010 may thus receive information and instructions from other computing systems or services via a network. The processing unit 1010 may also communicate to and from memory 1070 and further provide output information for an optional display 1050 via the input/output device interface 1040. For example, an analysis software (e.g., data analysis software or program such as FlowJo®) stored as executable instructions in the non-transitory memory of the analysis system can display the flow cytometry event data to a user. The input/output device interface 1040 may also accept input from the optional input device 1060, such as a keyboard, mouse, digital pen, microphone, touch screen, gesture recognition system, voice recognition system, gamepad, accelerometer, gyroscope, or other input device.

The memory 1070 may contain computer program instructions (grouped as modules or components in some embodiments) that the processing unit 1010 executes in order to implement one or more embodiments. The memory 1070 generally includes RAM, ROM and/or other persistent, auxiliary or non-transitory computer-readable media. The memory 1070 may store an operating system 1072 that provides computer program instructions for use by the processing unit 1010 in the general administration and operation of the computing device 1000. Data may be stored in data storage device 1090. The memory 1070 may further include computer program instructions and other information for implementing aspects of the present disclosure.

Utility

The subject integrated light interrogation modules, flow cytometers and methods find use in find use in a variety of applications where it is desirable to increase resolution and accuracy in the determination of parameters for analytes (e.g., cells, particles) in a biological sample. For example, the present invention may be employed in order to facilitate flow cytometer assembly, i.e., such that tedious assembly and adjustment is not required. Accordingly, the subject integrated light interrogation modules, flow cytometers and methods find use where it is desirable to simplify complex flow cytometer assembly that would normally include painstaking mechanical mounting and alignment. The subject integrated light interrogation modules, flow cytometers and methods may consequently be used to decrease the cost of flow cytometer assembly and improve the robustness of results obtained from flow cytometry. In some embodiments, the present invention may be employed where it is desirable to have modular flow cytometer components, i.e., such that components can be swapped for different modules as required to achieve a functionality of interest. In additional instances, the present invention may be employed where it is desirable to improve flow cytometer collection efficiency.

The present disclosure can be employed to characterize many types of analytes, in particular, analytes relevant to medical diagnosis or protocols for caring for a patient, including but not limited to: proteins (including both free proteins and proteins and proteins bound to the surface of a structure, such as a cell), nucleic acids, viral particles, and the like. Further, samples can be from in vitro or in vivo sources, and samples can be diagnostic samples.

Kits

Aspects of the invention also involve kits having an integrated light interrogation module. As such, in some embodiments, kits include a flow cell comprising a light accessible flow channel. Kits may further include a housing for surrounding the flow cell. In some embodiments, the housing is opaque. Additionally, integrated light interrogation modules within the subject kits may include one or more focusing optical assemblies integrated with the flow cell. In further embodiments, kits include one or more fiber optic light conveyors for configured to operably attach to the focusing optical assemblies of the integrated light interrogation module. Kits of interest also include one or more fiber optic light collection elements configured to operably attach to the focusing optical assemblies of the integrated light interrogation module. In certain embodiments, kits include multiple fiber optic light conveyors and fiber optic light collection elements such that more or fewer fiber optic light conveyors or fiber optic light collection elements may be operably attached, as desired. In some embodiments, kits also include one or more auxiliary lenses.

In additional embodiments, the subject kits include modules for generating excitation wavelength light and detecting fluorescent light from the flow cell. In such embodiments, kits may include one or more excitation modules. Excitation modules of interest include a plurality of lasers and are configured to be optically coupled to one or more of the provided fiber optic light conveyors. Further, embodiments of the instant kits include one or more detection modules. In such embodiment, the detection modules include a plurality of detectors and is configured to be optically coupled to one or more of the provided fiber optic light collection elements.

Kits may also include instructions for assembling a flow cytometer having an integrated light interrogation module. In such embodiments, instructions may guide the attachment of one or more fiber optic light conveyors and fiber optic light collection elements to the focusing optical assemblies via connectors. The instructions described herein may be included on storage media such as a floppy disk, hard disk, optical disk, magneto-optical disk, CD-ROM, CD-ft magnetic tape, non-volatile memory card, ROM, DVD-ROM, Blue-ray disk, solid state disk, and network attached storage (NAS). Any of these program storage media, or others now in use or that may later be developed, may be included in the subject kits. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. An integrated light interrogation module comprising:
    a flow cell comprising a light-accessible flow channel for transporting particles in a flow stream;
    a focusing optical assembly integrated with the flow cell; and
    a connector for operably attaching a fiber optic light conveyor to the focusing optical assembly, wherein the focusing optical assembly is configured to project excitation wavelength light from the fiber optic light conveyor onto a focal spot of the flow cell when the fiber optic light conveyor is operably attached to the connector.

2. The integrated light interrogation module according to claim 1, wherein the focusing optical assembly is attached to an outer surface of the flow cell.

3. The integrated light interrogation module according to claim 2, wherein the focusing optical assembly comprises a lens integrated with the flow cell in the direction of excitation as defined by the fiber optic light conveyor connector.

4. The integrated light interrogation module according to claim 3, wherein the focusing optical assembly comprises a second lens integrated with the flow cell in the direction of excitation as defined by the fiber optic light conveyor connector.

5. The integrated light interrogation module according to claim 4, wherein the second lens comprises a reflective material configured to reflect excitation wavelength light back to the focal spot.

6. The integrated light interrogation module according to claim 3, wherein the lens is a micro-lens.

7. The integrated light interrogation module according to claim 1, wherein the focusing optical assembly is embedded in the flow cell.

8. The integrated light interrogation module according to claim 1, wherein the fiber optic light conveyor connector is configured to releasably attach the fiber optic light conveyor to the focusing optical assembly.

9. The integrated light interrogation module according to claim 1, further comprising a connector for operably attaching a fiber optic light collection element to the focusing optical assembly, wherein the fiber optic light collection element is configured to collect fluorescent light emitted by the particles transported through the focal spot following irradiation of the particles with excitation wavelength light.

10. The integrated light interrogation module according to claim 9, further comprising an auxiliary lens positioned between the fiber optic fluorescent light collection element connector and the focusing optical assembly.

11. The integrated light interrogation module according to claim 9, wherein the integrated light interrogation module comprises a single focusing optical assembly.

12. The integrated light interrogation module according to claim 11, wherein the single focusing optical assembly is configured to operably connect to a single fiber optic light conveyor and a single fiber optic light collection element.

13. The integrated light interrogation module according to claim 1, further comprising an auxiliary lens positioned between the fiber optic fluorescent light conveyor connector and the focusing optical assembly.

14. The integrated light interrogation module according to claim 1, wherein the integrated light interrogation module comprises:
    a plurality of focusing optical assemblies integrated with the flow cell; and
    a plurality of connectors for operably attaching a fiber optic light conveyor to each focusing optical assembly in the plurality of focusing optical assemblies.

15. The integrated light interrogation module according to claim 14, further comprising a plurality of connectors for operably attaching a fiber optic light collection element to each focusing optical assembly in the plurality of focusing optical assemblies.

16. The integrated light interrogation module according to claim 14, wherein each of the fiber optic light conveyor connectors is arranged orthogonally along the length of the flow cell with respect to one or more of the adjacent fiber optic light conveyor connectors.

17. The integrated light interrogation module according to claim 1, further comprising a housing surrounding the flow cell.

18. The integrated light interrogation module according to claim 1, wherein the housing is opaque.

19. A flow cytometer comprising:
    a light source;
    a fiber optic light conveyor optically coupled to the light source; and
    an integrated light interrogation module comprising:
        a flow cell comprising a light-accessible flow channel for transporting particles in a flow stream;
        a focusing optical assembly integrated with the flow cell; and
        a connector for operably attaching the fiber optic light conveyor to the focusing optical assembly, wherein the focusing optical assembly is configured to project excitation wavelength light from the fiber optic light conveyor onto a focal spot of the flow cell when the fiber optic light conveyor is operably attached to the connector.

20. A method of analyzing a sample, the method comprising:
(a) introducing a biological sample into a flow cytometer comprising:
a light source;
a fiber optic light conveyor optically coupled to the light source; and
an integrated light interrogation module comprising:
a flow cell comprising a light-accessible flow channel for transporting particles in a flow stream;
a focusing optical assembly integrated with the flow cell; and
a connector for operably attaching a fiber optic light conveyor to the focusing optical assembly, wherein the focusing optical assembly is configured to project excitation wavelength light from the fiber optic light conveyor onto a focal spot of the flow cell when the fiber optic light conveyor is operably attached to the connector; and
(b) flow cytometrically analyzing the sample.

* * * * *